(12) United States Patent
Imoto

(10) Patent No.: US 7,253,833 B2
(45) Date of Patent: *Aug. 7, 2007

(54) VEHICLE PERIPHERY VISUAL RECOGNITION SYSTEM, CAMERA AND VEHICLE PERIPHERY MONITORING APPARATUS AND VEHICLE PERIPHERY MONITORING SYSTEM

(75) Inventor: Masayoshi Imoto, Aichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 766 days.

This patent is subject to a terminal disclaimer.

(21) Appl. No.: 10/294,823

(22) Filed: Nov. 15, 2002

(65) Prior Publication Data

US 2003/0095182 A1 May 22, 2003

(30) Foreign Application Priority Data

| Nov. 16, 2001 | (JP) | ............................. 2001-351612 |
| Jan. 9, 2002 | (JP) | ............................. 2002-002161 |
| Jan. 11, 2002 | (JP) | ............................. 2002-004532 |

(51) Int. Cl.
    H04N 7/18 (2006.01)
(52) U.S. Cl. .................. 348/148; 348/49; 348/335; 359/618; 396/331
(58) Field of Classification Search ................ 348/335, 348/369, 42, 49, 51, 148; 396/322, 324, 396/326, 327, 331, 332; 359/462, 466, 633, 359/618, 639, 340; 353/33, 81
See application file for complete search history.

(56) References Cited

U.S. PATENT DOCUMENTS

| 4,414,575 | A | * | 11/1983 | Yamamoto et al. | ......... 348/350 |
| 4,890,159 | A | * | 12/1989 | Ogiu | ........................... 348/72 |
| 5,627,547 | A | * | 5/1997 | Ramaswamy et al. | . 342/357.08 |
| 5,680,123 | A | * | 10/1997 | Lee | .............. 340/937 |
| 5,708,857 | A | * | 1/1998 | Ishibashi | ..................... 396/21 |
| 5,756,988 | A | * | 5/1998 | Furuta | ..................... 250/208.1 |
| 5,959,555 | A | * | 9/1999 | Furuta | ........................ 340/937 |
| 6,046,766 | A | * | 4/2000 | Sakata | ........................ 348/148 |
| 6,124,977 | A | | 9/2000 | Takahashi | |
| 6,166,764 | A | * | 12/2000 | Sakata | ........................ 348/148 |
| 6,441,977 | B1 | | 8/2002 | Mashima | |
| 6,476,855 | B1 | * | 11/2002 | Yamamoto | .................. 348/148 |
| 6,535,242 | B1 | * | 3/2003 | Strumolo et al. | ........... 348/148 |
| 6,693,518 | B2 | * | 2/2004 | Kumata et al. | ............. 340/435 |
| 6,704,052 | B1 | | 3/2004 | Togino et al. | |

(Continued)

FOREIGN PATENT DOCUMENTS

DE    198 01 884 A1    7/1999

(Continued)

Primary Examiner—Vivek Srivastava
Assistant Examiner—Chriss S. Yoder
(74) Attorney, Agent, or Firm—Oliff & Berridge, PLC

(57) ABSTRACT

A vehicle periphery visual recognition system 1 is made up of an image pickup unit 11 for picking up images of image pickup ranges in three directions of the lower area at the front of a vehicle and the left and right side areas at the same time, and a controller 10 for performing image processing of an image signal provided by the image pickup unit 11 and then outputting the signal to a display 15.

14 Claims, 18 Drawing Sheets

U.S. PATENT DOCUMENTS

| | | | |
|---|---|---|---|
| 6,836,822 B1 * | 12/2004 | Hatano et al. | 711/117 |
| 6,891,563 B2 * | 5/2005 | Schofield et al. | 348/148 |
| 6,897,892 B2 * | 5/2005 | Kormos | 348/148 |
| 7,006,303 B2 * | 2/2006 | Imoto | 359/726 |
| 2001/0028393 A1 * | 10/2001 | Tomida et al. | 348/207 |
| 2004/0051634 A1 * | 3/2004 | Schofield et al. | 340/461 |

FOREIGN PATENT DOCUMENTS

| | | |
|---|---|---|
| DE | 199 23 964 A1 | 12/1999 |
| EP | 1 129 904 A2 | 3/2001 |
| EP | 1 145 906 A2 | 4/2001 |
| JP | A-05-181005 | 7/1993 |
| JP | A-06-255423 | 9/1994 |
| JP | A-06-321011 | 11/1994 |
| JP | A-07-063553 | 3/1995 |
| JP | U-7-37806 | 7/1995 |
| JP | A 9-104129 | 4/1997 |
| JP | A-10-055022 | 2/1998 |
| JP | A-10-104765 | 4/1998 |
| JP | A-11-142783 | 5/1999 |
| JP | U-3063778 | 9/1999 |
| JP | A-11-337811 | 12/1999 |
| JP | A-2000-056380 | 2/2000 |
| JP | A 2000-89301 | 3/2000 |
| JP | A-2000-168441 | 6/2000 |
| JP | A-2001-043494 | 2/2001 |

* cited by examiner

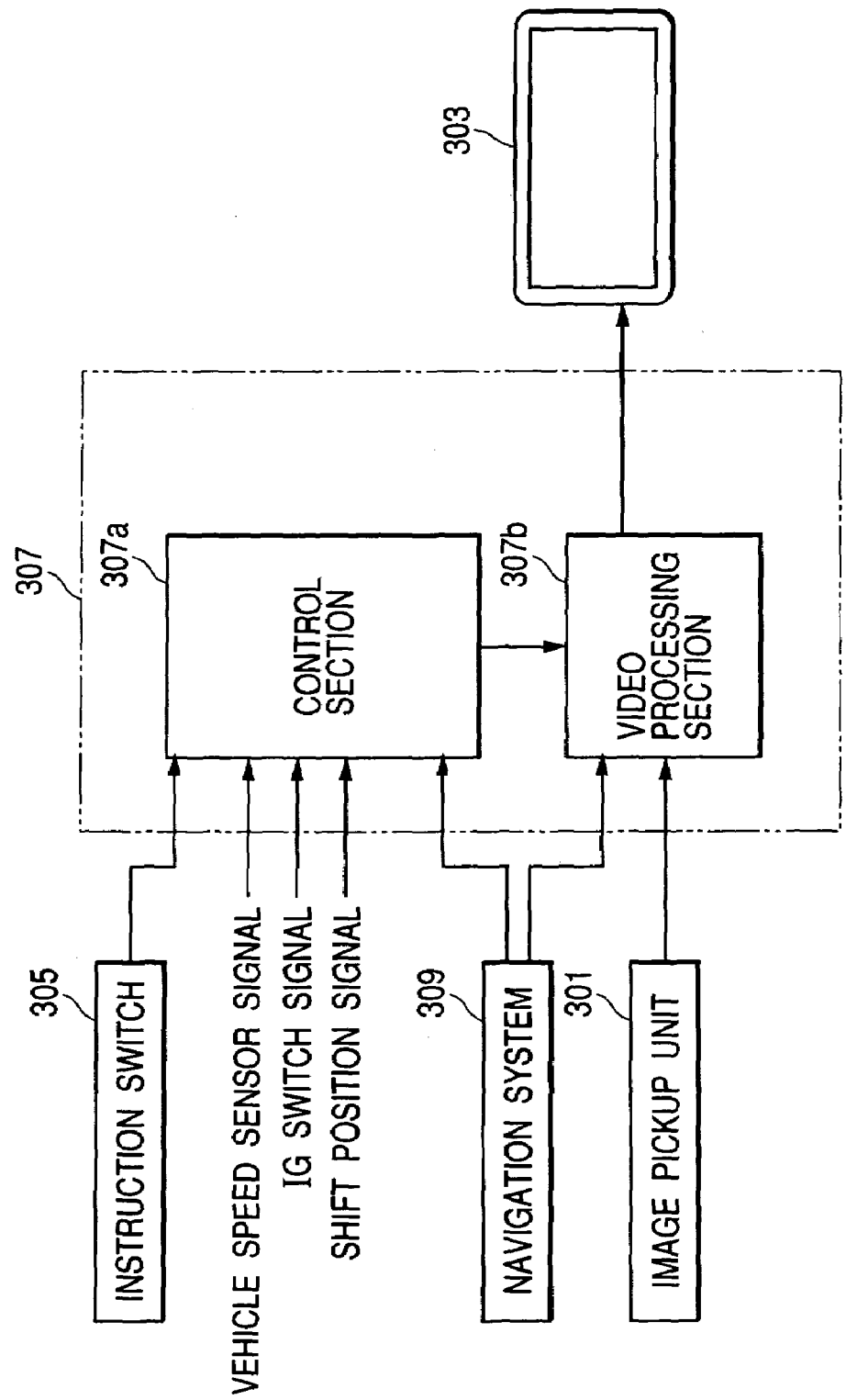

VEHICLE PERIPHERY VISUAL RECOGNITION SYSTEM, CAMERA AND VEHICLE PERIPHERY MONITORING APPARATUS AND VEHICLE PERIPHERY MONITORING SYSTEM

BACKGROUND OF THE INVENTION

This invention relates to a vehicle periphery visual recognition system for picking up an image in the range in which the visual field of a person in a vehicle is hard to cover.

Further, this invention relates to a camera for picking up images of a plurality of visual fields at the same time and a vehicle periphery monitoring apparatus using the camera.

Still further, this invention relates to a vehicle periphery monitoring system for picking up images of a plurality of different image pickup areas in the periphery of a vehicle and displaying the picked-up images in a cabin.

Hitherto, a visual recognition system has been proposed for picking up an image of a blind spot such as a lower area at the front of a vehicle or a rear area of a vehicle that the visual field of a driver is hard to cover and displaying the image on a display in the vehicle. For example, the Unexamined Japanese Patent Application Publication No. 2000-89301 discloses a visual recognition system that can pick up images of areas in three directions of the lower side at the front of a vehicle and the left and right at the front of the vehicle at the same time. FIG. 6 is a schematic plan view to show the main part of an image pickup unit 100 used with this kind of system. FIG. 7 is a schematic drawing of the image pickup unit 100 shown in FIG. 6 viewed from the right of the image pickup unit 100. FIG. 8 is a side view of a vehicle 101 installing the image pickup unit 100 in a front end part.

As shown in FIG. 6, the image pickup unit 100 comprises a prism 102 shaped roughly like an isosceles triangle in cross section and a retention member 103 for retaining a lens system 105 and an image pickup device 104 of CCD, CMOS, etc. The image pickup unit 100 is disposed with one vertex 102V of the prism 102 directed toward front $D_1$ of the vehicle 101 shown in FIG. 8 and the optical axis (not shown) of the lens system 105 directed toward the front $D_1$. The image pickup unit 100 also comprises a cabinet (not shown for convenience of the description) for accommodating the prism 102 and the retention member 103.

The prism 102 is a columnar body which is shaped roughly like an isosceles triangle in cross section. Light coming from left and right side areas $A_1$ and $A_2$ of the vehicle 101 shown in FIG. 8 is incident on two sides 102L and 102R extending from the vertex 102V. The light incident on the left side 102L from the left side area $A_2$ is refracted in the prism 102, is internally reflected on the right side 102R, is guided into a rear side 102B, and is emitted. On the other hand, the light incident on the right side 102R from the right side area $A_1$ is also refracted, is internally reflected on the left side 102L, is guided into the rear side 102B, and is emitted. Next, the lens system 105 gathers the light emitted from the rear side 102B and forms a light image on the image pickup device 104. The image pickup device 104 executes photoelectric conversion of the light image and outputs an image signal to a controller (not shown) installed in the vehicle through a cable, etc.

FIG. 7 shows the image pickup unit 100 shown in FIG. 6 viewed from the right. As shown in FIG. 7, a bottom 102C of the prism 102 has an inclined end face, and the prism 102 is disposed so as to be upright perpendicularly to a horizontal plane 106 of the vehicle 101. The lens system 105 is disposed with an optical axis 107 thereof directed downward at a predetermined angle with respect to the horizontal plane 106. Accordingly, light coming from a lower area $A_3$ at the front of the vehicle 101 passes through the lower space of the bottom 102C of the prism 102, is formed as an image through the lens system 105, and is received at the image pickup device 104.

The image signals provided by simultaneously picking up the images of the left and right areas $A_1$ and $A_2$ and the lower area $A_3$ at the front of the vehicle 101 are subjected to image processing in the controller (not shown) installed in the vehicle and then are displayed as images on a display (not shown) placed on an instrument panel, etc., in the vehicle 101. FIG. 9 is a schematic drawing to show an example of images 110 displayed on the display. The images in the right area $A_1$, the left side area $A_2$, and the front lower area $A_3$ are displayed in split display areas $B_1$, $B_2$, and $B_3$ of the display. This enables the driver to check the blind spots in the three directions for safety.

However, the described visual recognition system involves a problem of narrow visual field in the vertical direction. This problem will be discussed in detail with reference to FIG. 8. Assume that the image pickup unit 100 shown in FIG. 8 is installed at a position at height $L_4$=0.9 m above ground. 108. In FIG. 8, $VV_1$ denotes a direct vision possible range of the driver in the vehicle 101, $HV_2$ denotes an image pickup possible range of the image pickup unit 100 installed in the front end part of the vehicle 101, and $HV_3$ denotes a required image pickup range required for the image pickup unit 100.

Vertical angle $\theta_1$ of the image pickup possible range $HV_2$ is about 19 degrees, vertical angle $\theta_2$ of the required image pickup range $HV_3$ is about 54 degrees, and vertical angle $\theta_3$ in an invisible range out of the required image pickup range $HV_3$ in the vicinity just below a bumper 101a is about 21 degrees. Front distance $L_1$ from the bumper 101a positioned at the front end of the vehicle 101 to a front end point 109 of the image pickup possible range $HV_2$ is about 3.3 m, front distance $L_2$ in the range of excluding the image pickup possible range $HV_2$ from the required image pickup range $HV_3$ is about 1.0 m, and front distance $L_3$ in the invisible range is about 0.2 m.

Since the image pickup unit 100 in the related art adopts the standard lens system 105 having the viewing angle of horizontal view angle 50 degrees and vertical view angle 38 degrees, the image pickup possible range $HV_2$ is limited and the required image pickup range $HV_3$ is not covered. To adopt a wide-angle lens system to provide viewing angle in the vertical direction, the viewing angle in the horizontal direction is also enlarged and thus the prism 102 shown in FIG. 6 inputs incidence light not totally reflected on the inner face of the side 102L, 102R. Accordingly, the left and right areas $A_2$ and $A_1$ of the vehicle 101 are not displayed at end parts 111R and 111L of the display areas $B_1$ and $B_2$ shown in FIG. 9, and a problem of lowering viewability occurs.

By the way, to internally reflect light on the side of the prism 102, incidence angle $\phi$ on the reflection plane needs to satisfy the relation expression of $\sin \phi > 1/n$, namely, $\phi > \arcsin(1/n)$ (n: Refractive index of prism 102). For example, if a lens system having horizontal view angle 120 degrees and vertical view angle 90 degrees is adopted and the prism 102 with refractive index n=1.5 is adopted, light incident from the range of horizontal angle 20 degrees on the left and right excluding the image pickup range of horizontal angle 80 degrees at the center is refracted in the prism 102 and is emitted intact to the outside of the prism 102 without being internally reflected on the side 102L, 102R. Therefore, an image of unnecessary light, which is not the image of the left area $A_2$, the right area $A_1$, is displayed in the end area 111L, 111R of the display area $B_2$, $B_1$ shown in FIG. 9. Thus, a problem of becoming very hard to see occurs.

On the other hand, the Japanese Patent No. 3,154,676 discloses a "vehicle-installed camera image combining vision-through apparatus" adopting a very-wide-angle camera having a wide vertical view angle as a related art. The apparatus comprises means for executing vision-through conversion of an image picked up by the very-wide-angle camera in real time, combining a plurality of camera images, and displaying the resultant image on one display. However, the apparatus described in the Japanese Patent No. 3,154,676 requires image memory and complicated circuit configuration for executing vision-through conversion and thus involves a problem of increasing the manufacturing cost.

Further, an apparatus described in the Unexamined Japanese Patent Application Publication No. 2000-89301 is known as a vehicle periphery monitoring apparatus for picking up images of visual fields in three directions at the same time by a single image pickup device.

A camera of the vehicle periphery monitoring apparatus in the related art once internally reflects incidence light from the left and right visual fields in a prism for optical path change and then forms the light as an image on the image pickup device through an image pickup lens and forms incidence light from the front visual field as an image directly on the image pickup device through the image pickup lens without the intervention of the prism, thereby picking up the images of the visual fields in the three directions of the left and right and the front at the same time by the single image pickup device.

However, with the described camera, the incidence light from the left and right visual fields receives the effect of mirror image inversion by one reflection in the prism and is formed as an image on the image pickup device; whereas, the incidence light from the front visual field is not through the prism and thus is formed as an image on the image pickup device without receiving the effect of mirror image inversion. Thus, the images of the left and right visual fields and the front visual field are picked up by the image pickup device with mutually different directions inverted.

Thus, the vehicle periphery monitoring apparatus in the related art needs to comprise processing means for performing partial inversion processing for the image picked up by the image pickup device and needs to apply partial inversion processing to the image portions of the left and right visual fields or the image portion of the front visual field, of the image picked up by the image pickup device for matching the directions of the image portions and eliminating mixing of the normal image and the mirror image for display. Accordingly, the vehicle periphery monitoring apparatus has disadvantage in that the signal processing circuit configuration becomes complicated.

Still further, available as this kind of vehicle periphery monitoring system in a related art is a system for picking up images of image pickup areas in three directions in the periphery of a vehicle and displaying the images of the image pickup areas in the three directions on a single display screen of a display in a cabin. The images of all the image pickup areas in the three directions are always displayed on the display screen of the display during the system operation.

By the way, it may be unnecessary to display the images of all the image pickup areas in the three directions. For example, if the image pickup areas in the three directions contain an image pickup area in the slanting down direction at the rear of the vehicle, the image of the image pickup area needs to be visually recognizable only when the vehicle starts, runs at low speed, etc., and need not be displayed in any other situation.

However, the vehicle periphery monitoring system in the related art always displays the images of all the image pickup areas in the three directions on the display screen of the display and thus the image of an unnecessary image pickup area is displayed depending on the operation state of the vehicle and it becomes hard to visually recognize the necessary images of other image pickup areas as the unnecessary image pickup area image is displayed; this is a problem.

SUMMARY OF THE INVENTION

It is therefore an object of the invention to provide a vehicle periphery visual recognition system at low cost for making it possible to provide compatibility between enlargement of the visual field range and enhancement of viewability.

Further, it is therefore an object of the invention to provide a camera capable of picking up images of side visual fields and the front visual field by an image pickup device at the same time with the directions matched according to a simple configuration and a vehicle periphery monitoring apparatus using the camera for monitoring side and front blind spot areas according to a simple configuration.

Still further, it is therefore an object of the invention to provide a vehicle periphery monitoring system that can stop display of an image of at least any one of image pickup areas in response to the operation state of a vehicle and can display only a necessary image for enhancing viewability of the vehicle periphery image.

To the end, according to the invention as in aspect 1, there is provided a vehicle periphery visual recognition system comprising an image pickup unit being disposed facing the outer periphery of a vehicle for picking up images of a plurality of image pickup ranges in the periphery of the vehicle and a controller for performing image processing of an image signal output from the image pickup unit and then outputting the signal to a display, characterized in that the image pickup unit comprises a wide-range lens system having a viewing angle of a horizontal view angle of 70 degrees or more; an image pickup device for receiving light passing through the wide-range lens system, converting the light into an image signal, and outputting the image signal; and light guide means for making incidence light from the image pickup range incident on the wide-range lens system, and that the controller comprises a resolution conversion section for enlarging the specified range of the image signal output from the image pickup unit.

In the invention as in aspect 2, in the vehicle periphery visual recognition system as in aspect 1, the light guide means once reflects incidence light from at least one of the plurality of image pickup ranges, emits the reflected light to the wide-range lens system, and allows incidence light from other image pickup ranges to be incident on the wide-range lens system without reflecting the incidence light from other image pickup ranges, and the controller further comprises an image inversion section for performing left and right inversion of the specified range of the image signal output from the image pickup unit; and a switch control section for controlling an enlargement ratio of the specified range in the resolution conversion section and switch between the presence and absence of left and right inversion of the specified range in the image inversion section in response to the operation state of the vehicle.

In the invention as in aspect 3, in the vehicle periphery visual recognition system as in aspect 1, the controller further comprises an image pickup device drive section for controlling the pixel read direction of the image pickup device and the pixel read range.

In the invention as in aspect 4, in the vehicle periphery visual recognition system as in any one of aspects 1 to 3, the image pickup device has a resolution with the effective number of pixels in a horizontal direction being 700 or more.

In the invention as in aspect 5, in the vehicle periphery visual recognition system as in any one of aspects 1 to 4, the light guide means comprises a columnar prism shaped like a triangle in cross section having three sides of left and right sides on which light from the image pickup ranges of the left and right sides relative to the vehicle is incident and a rear side where the light incident on the left and right sides is internally reflected on the opposite side and then is emitted, and incidence light from the front or rear lower image pickup range relative to the vehicle passes through under the bottom of the prism and is incident on the wide-range lens system.

In the invention as in aspect 6, in the vehicle periphery visual recognition system as in aspect 5, a light shield member is placed on the bottom of the prism of the light guide means.

To the end, according to the invention as in aspect 7, there is provided a camera comprising image pickup means comprising a single image pickup device and image pickup lenses placed at the front of the image pickup device; and one or more prisms each shaped roughly like a triangle pole, placed at the front of the image pickup means with prism back faces directed to the image pickup lenses and prism sides directed to different side visual fields for twice internally reflecting light incident on the prism side on the visual field side between the prism side on the opposite visual field side and the prism side on the visual field side and emitting the light from the prism back face, wherein the image pickup means forms images of the incident light twice internally reflected through the prisms from the side visual fields and incident light from the front visual field without the intervention of the prisms on the image pickup device through the image pickup lenses at the same time.

In the invention as in aspect 8, the prisms are placed symmetrically in a pair at the front of the image pickup means with the left prism side of the left prism directed to the left visual field and the right prism side of the right prism directed to the right visual field.

In the invention as in aspect 9, metal is evaporated on the prism side on the opposite visual field side of the prism.

In the invention as in aspect 10, the image pickup lens is a wide-range lens.

In the invention as in aspect 11, the image pickup means is placed with the image pickup direction directed to the front and inclined downward and inputs the incident light from the front visual field from the lower half area of a vertical view angle of the image pickup means and the incident light through the prisms from the side visual fields from the upper half area of the vertical view angle.

In the invention as in aspect 12, the prism is placed in an upright position at the front of the image pickup means and a portion projected to the lower half area of the vertical view angle of the image pickup means is cut.

In the invention as in aspect 13, light shield treatment is applied to the cut face of the prism.

In the invention as in aspect 14, when the number of the prisms is two or more, the prisms are formed in one piece.

In the invention as in aspect 15, a prism holder is formed integrally with the prism.

In the invention as in aspect 16, at least one of the prism side on the visual field side, the prism side on the opposite visual field side, and the prism back face of the prism is formed as a curved surface.

According to the invention as in aspect 17, there is provided a vehicle periphery monitoring apparatus comprising a camera as in any of aspects 7 to 16 being installed in a vehicle for picking up images of a plurality of visual fields in the periphery of the vehicle; a processing section for processing the images picked up by the camera; and a display being installed in a cabin for displaying the images processed by the processing section.

In the invention as in aspect 18, the camera is installed at the front or rear of the vehicle and picks up images of three-direction visual fields of the visual fields in the left and right directions of the vehicle and the visual field in the travel or back direction at the same time.

In the invention as in aspect 19, the processing section superposes a mask image on an unnecessary portion of the image picked up by the camera for display on the display.

In the invention as in aspect 20, the processing section enlarges a necessary portion of the image picked up by the camera for display on the display.

To the end, according to the invention, there is provided a vehicle periphery monitoring system comprising image pickup means for picking up images of a plurality of different image pickup areas in the periphery of a vehicle and outputting the images; display means being installed in a cabin; and control means for providing a plurality of display areas corresponding to the plurality of image pickup areas on a display screen of the display means, displaying the images of the image pickup areas corresponding to the display areas, inputting a signal indicating the operation state of the vehicle, and stopping display of the image of at least any one image pickup area, of the images of the plurality of image pickup areas displayed in the plurality of display areas if the control means determines that the operation state of the vehicle matches a predetermined condition based on the signal.

Preferably, if the control means determines that the operation state of the vehicle matches the predetermined condition, the control means may superpose a predetermined different image other than the images of the plurality of image pickup areas on the image of at least any one image pickup area, of the images of the plurality of image pickup areas displayed in the plurality of display areas and may make it substantially impossible to visually recognize the image of at least any one image pickup area, thereby stopping display of the image of the image pickup area.

Preferably, the image pickup means may pick up images of three image pickup areas in the left direction at the front of the vehicle, the right direction at the front, and the slanting down direction at the front as the plurality of image pickup areas.

Preferably, the image pickup means may pick up images of three image pickup areas in the left direction at the rear of the vehicle, the right direction at the rear, and the slanting down direction at the rear as the plurality of image pickup areas.

Preferably, the different image may contain an image of a mark representing the shape of the vehicle.

Preferably, the different image may contain an image of a symbol mark given to a start switch of the vehicle periphery monitoring system.

Preferably, the different image may be an image given from a different vehicle-installed information apparatus.

Preferably, the different vehicle-installed information apparatus may be a navigation system, and the predetermined different image may be a navigation image.

Preferably, the signal input to the control means may include an IG switch signal indicating the state of an ignition switch and a vehicle speed sensor signal indicating the vehicle speed, and the control means may display the images of all the image pickup areas in the corresponding display areas of the display means in at least a part of the time period until the control means detects the vehicle speed reaching a predetermined value based on the vehicle speed sensor signal after detecting an engine starting based on the IG switch signal.

Preferably, the vehicle periphery monitoring system may further comprise input acceptance means for accepting operation entry to give an instruction for switching the display mode of the display area of the display means, wherein if the input acceptance means accepts operation entry to give an instruction for displaying the images of all the image pickup areas on the display means in a state in which display of the image of at least any one image pickup area, of the images of the plurality of image pickup areas on the display means is stopped, the control means may display the images of all the image pickup areas in the corresponding display areas of the display means.

Preferably, the vehicle periphery monitoring system may further comprise a navigation system for showing a route from the detected current position of the vehicle to a preset destination and outputting a destination approach signal if the distance from the current position to the destination becomes a predetermined distance or less, wherein if the navigation system outputs the destination approach signal, the control means may display the images of all the image pickup areas in the corresponding display areas of the display means.

BRIEF DESCRIPTION OF THE DRAWINGS

FIG. 28 is a block diagram of a vehicle periphery monitoring system according to a fifth embodiment of the invention.

DETAILED DESCRIPTION OF THE PREFERRED EMBODIMENTS

Referring now to the accompanying drawings, there are shown preferred embodiments of the invention.

First Embodiment

Figure 1:
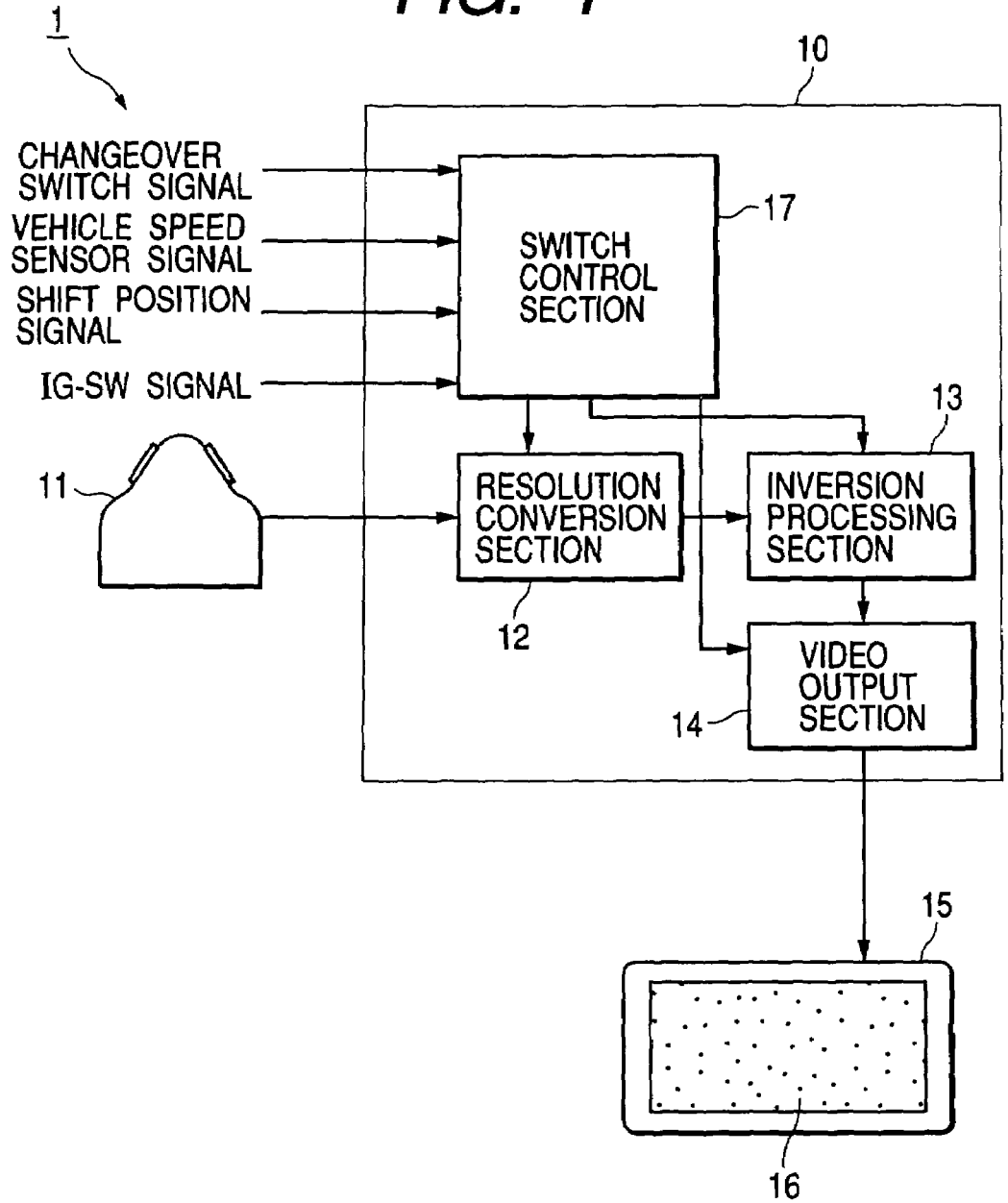
FIG. 1 is a functional block diagram to show a rough configuration of a vehicle periphery visual recognition system according to a first embodiment of the invention.

FIG. 1 is a functional block diagram to show a rough configuration of a vehicle periphery visual recognition system 1 according to a first embodiment of the invention. The vehicle periphery visual recognition system 1 is made up of an image pickup unit 11 for picking up images of image pickup ranges in three directions of the lower area at the front of a vehicle and the left and right side areas at the same time, and a controller 10 for performing image processing of image signals provided by the image pickup unit 11 and then outputting the signals to a display 15.

Figure 2:
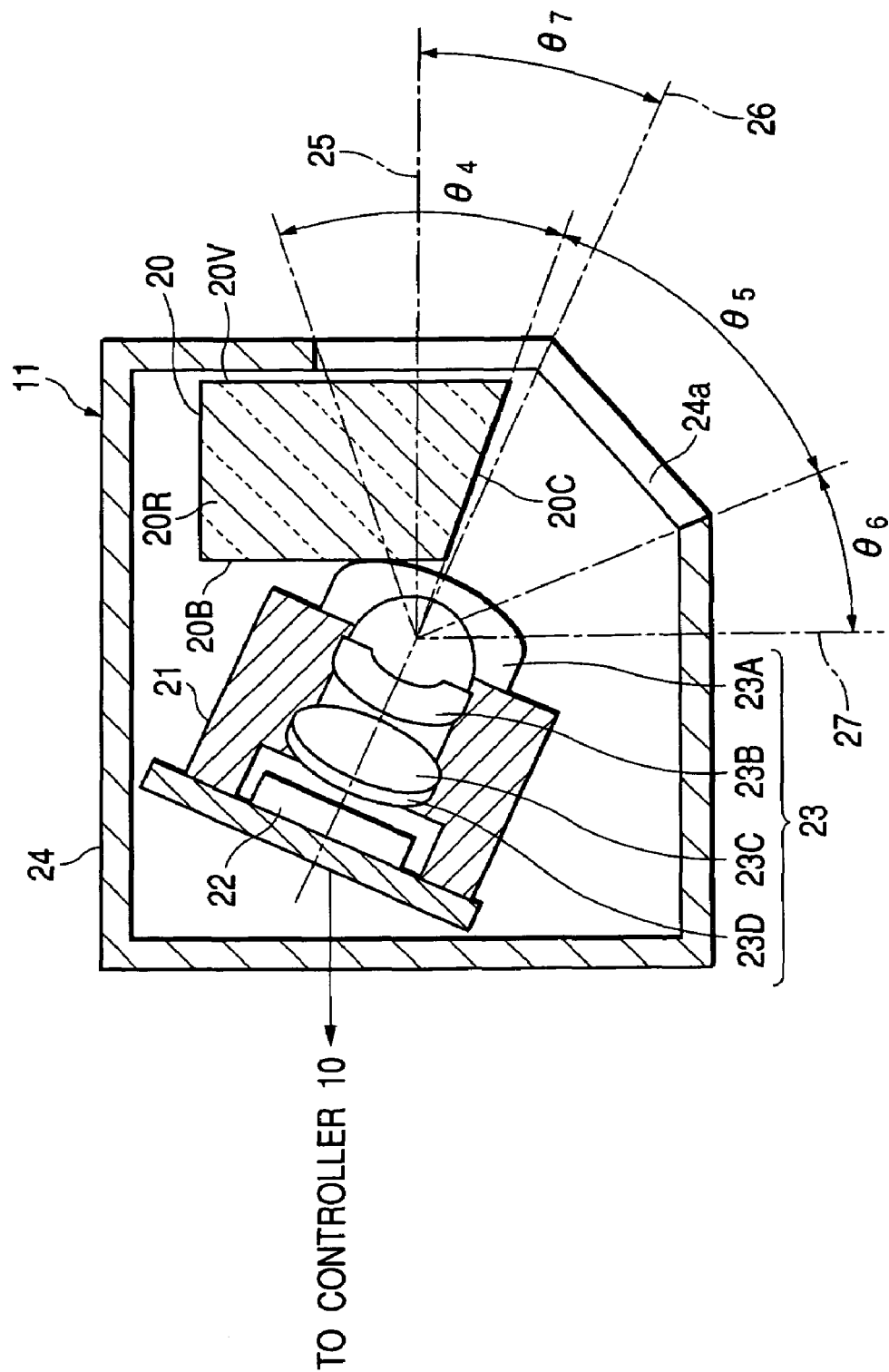
FIG. 2 is a schematic drawing to show the cross section of an image pickup unit of the vehicle periphery visual recognition system according to the first embodiment of the invention.

FIG. 2 is a schematic drawing to show the cross section of the image pickup unit 11. The image pickup unit 11 comprises a columnar prism 20 shaped roughly like an isosceles triangle in cross section, a wide-range lens system 23 for forming an image of light incident from the lower area at the front of the vehicle, and an image pickup device 22 for receiving the light passing through the wide-range lens system 23. The wide-range lens system 23 and the image pickup device 22 are fixedly secured to a retention member 21, which is placed in a cabinet 24 together with the prism 20. The resolution of the image pickup device 22 has the effective number of pixels of about 250000 (the number of horizontal pixels is 512 and the number of vertical pixels is 490).

Figure 8:
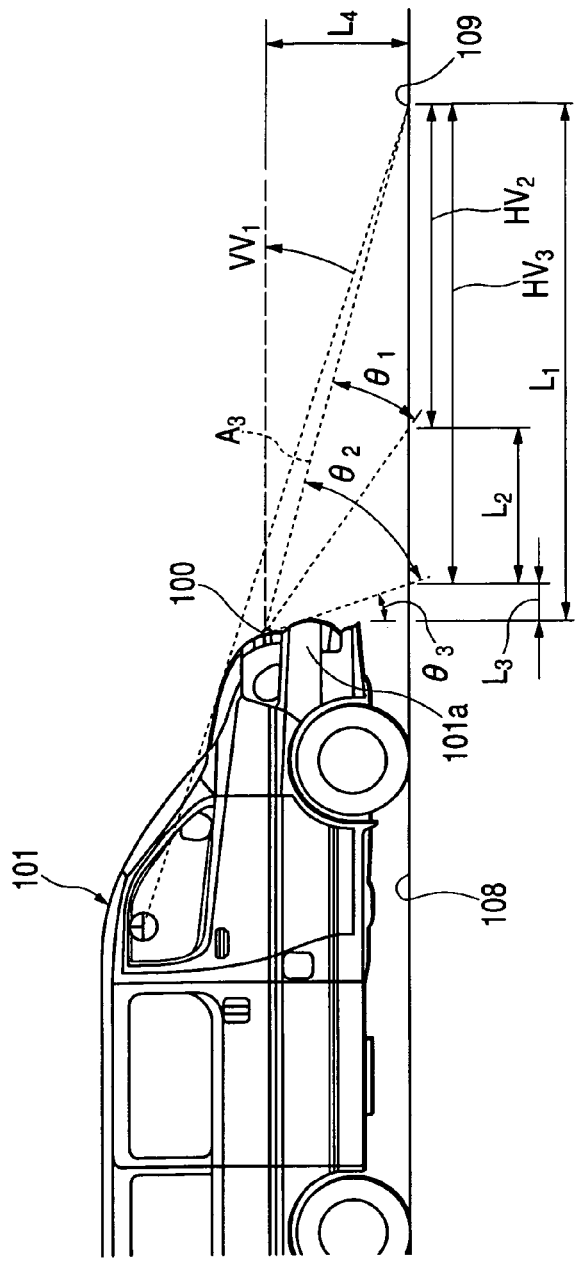
FIG. 8 is a side view of a vehicle installing the vehicle visual recognition system.
Figure 9:
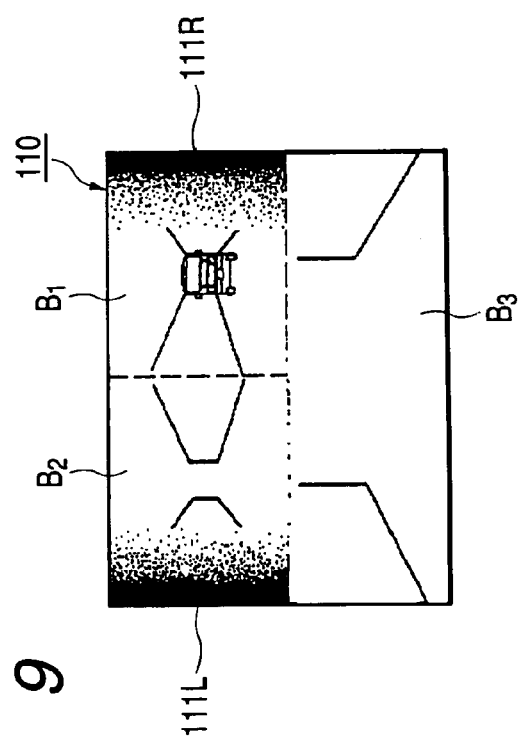
FIG. 9 is a schematic drawing to show images picked up in the vehicle visual recognition system in the related art.

Like the image pickup unit 100 in the related art shown in FIG. 8, the image pickup unit 11 is attached in the lower vicinity of an emblem in the front end part of the vehicle so that a front end line 20V forming the vertex of the isosceles triangle of the prism 20 is directed to the front of the vehicle. FIG. 2 is a drawing of the image pickup unit 11 viewed from the right and shows a right side 20R of the prism 20.

It is desirable that the wide-range lens system 23 should have a horizontal view angle of 70 degrees or more. The wide-range lens system 23 in the embodiment is made up of a plurality of lenses 23A, 23B, 23C, and 23D, and has the viewing angle of horizontal view angle 120 degrees and vertical view angle 90 degrees ($=\theta_4+\theta_5$). An optical axis 26 of the wide-range lens system 23 is adjusted so that it is directed downward about 25 degrees ($=\theta_7$) from a horizontal plane 25. Adjustment is made so that angle $\theta_6$ between the boundary of the image pickup range corresponding to the vertical view angle of the wide-range lens system 23 and a vertical plane 27 orthogonal to the horizontal plane 25 becomes about 20 degrees. FIG. 2 shows a group of four lenses, but the invention is not limited to it and a group of less than four lenses or five or more lenses may be adopted.

Figure 6:
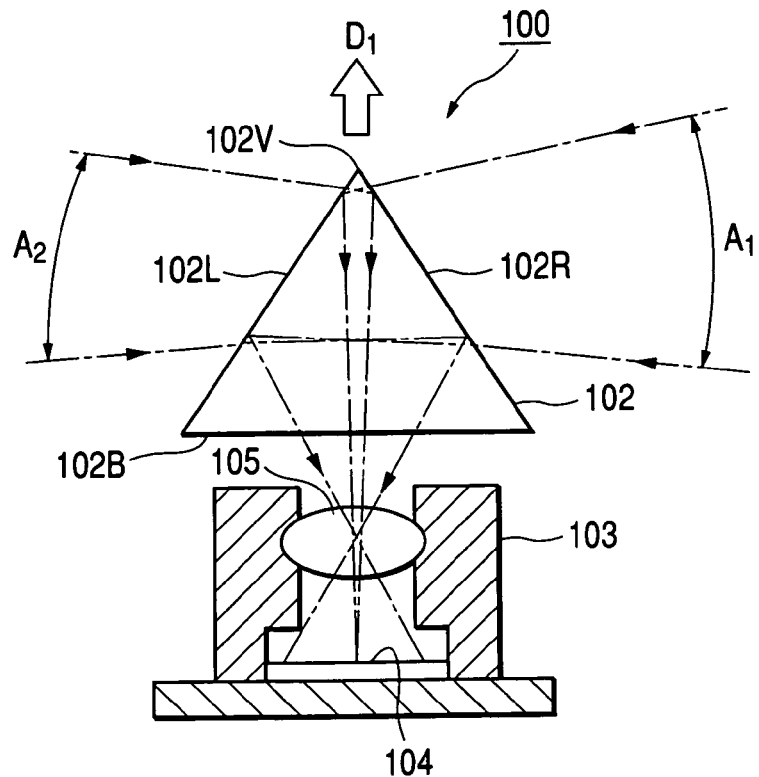
FIG. 6 is a schematic plan view to show the main part of an image pickup unit of a vehicle visual recognition system in a related art.
Figure 7:
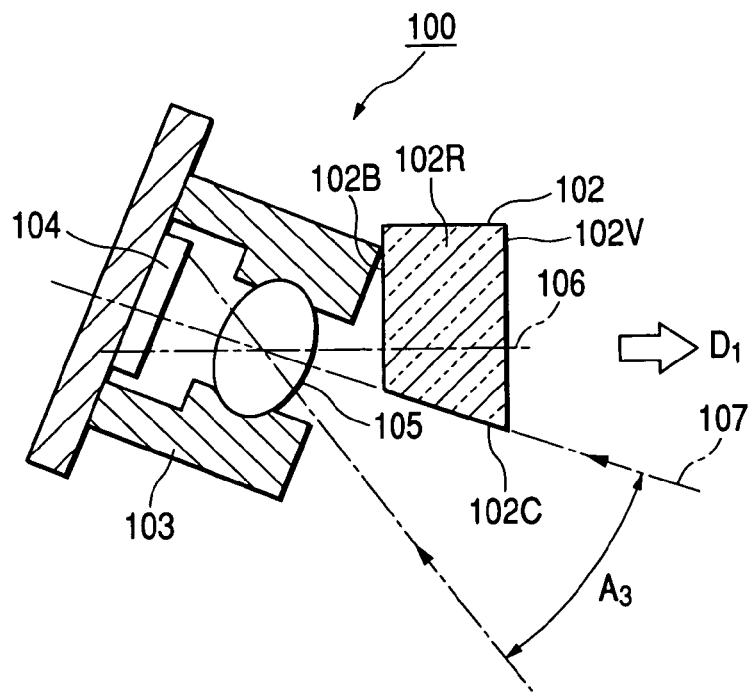
FIG. 7 is a drawing of the image pickup unit shown in FIG. 6 viewed from the right of the image pickup unit.

The prism 20 has a bottom 20C of a cut face inclined to the front. Like the prism 102 in the related art shown in FIG. 6, the prism 20 internally reflects light incident from the left and right side areas of the periphery of the vehicle and emits the light from a rear side 20B. The emitted light is formed through the wide-range lens system 23 on the image pickup device 22 as an image. The image pickup device 22 executes photoelectric conversion of the light image and outputs the image signal provided by the photoelectric conversion to the controller 10 installed in the vehicle through a cable.

Light from the lower area at the front of the vehicle enters the cabinet 24 through an opening 24a and is incident on the wide-range lens system 23 without the intervention of the prism 20. The wide-range lens system 23 can gather light in the vertical angle range of about 55 degrees between the bottom 20C of the prism 20 and the opening 24a. Thus, it is made possible for the wide-range lens system 23 to gather light from the required image pickup range $HV_3$ shown in FIG. 8.

Light shield treatment is applied to the surface of the bottom 20C of the prism 20. Specifically, abrasive blasting is applied to the surface to make the surface rough, and the rough surface is formed with a light shield face to which black paint having a high refractive index is applied. Accordingly, light reflection on the bottom 20C of the prism 20 is suppressed and picking up a ghost image caused by unnecessary light is prevented.

As described above, the image pickup device 22 can output the image signal provided by picking up the images of the image pickup ranges in the three directions of the left and right side areas of the periphery of the vehicle and the lower area at the front of the vehicle to the controller 10. Display of the image signal provided by the image pickup device 22 without processing the image signal is a picked-up image 30 shown in FIG. 3. Since incidence light from the side area of the vehicle is internally reflected in the prism 20 and is introduced into the wide-range lens system 23, the image picked up by the image pickup device 22 becomes a mirror image with the left and right inverted. Thus, a mirror image of the right side area of the vehicle is displayed in a left area $H_1$ of the picked-up image 30, and a mirror image of the left side area is displayed in a right area $H_2$. On the other hand, light from the lower area at the front of the vehicle is incident on the wide-range lens system 23 without the intervention of the prism 20 and thus a normal image with the left and right not inverted is displayed in an area $V_1$ below the picked-up image 30.

As shown in FIG. 1, the controller 10 comprises a resolution conversion section 12 for performing interpolation processing to enlarge an image signal input from the image pickup unit 11 at a predetermined enlargement ratio, an inversion processing section 13 for performing left and right inversion processing for the image signal output from the resolution conversion section 12, and a video output section 14 for converting the signal output from the inversion processing section 13 into a video signal matched with the display 15 and outputting the video signal.

The controller 10 also comprises a switch control section 17 for controlling the operation of the resolution conversion section 12 and the inversion processing section 13. Control signals such as a changeover switch signal output from an input unit of an external touch panel (not shown), etc., a vehicle speed sensor signal output from a vehicle speed sensor (not shown), a shift position signal indicating the setup state of a shift position, and an ignition switch signal (IG SW signal) indicating the start or stop state of an engine are input to the switch control section 17. The switch control section 17 controls the operation of the functional blocks in the controller 10 based on the control signals.

An operation example of the described vehicle periphery visual recognition system 1 will be discussed in detail.

The driver first turns on the ignition switch signal for starting the engine of the vehicle. Next, the driver turns on power of the image pickup unit 11 and the controller 10 of the vehicle periphery visual recognition system 1 and power of the display 15. At this time, the ignition switch signal which is on, the shift position signal indicating the parking mode, and the vehicle speed sensor signal indicating the vehicle stop state are input to the switch control section 17.

Figure 3:
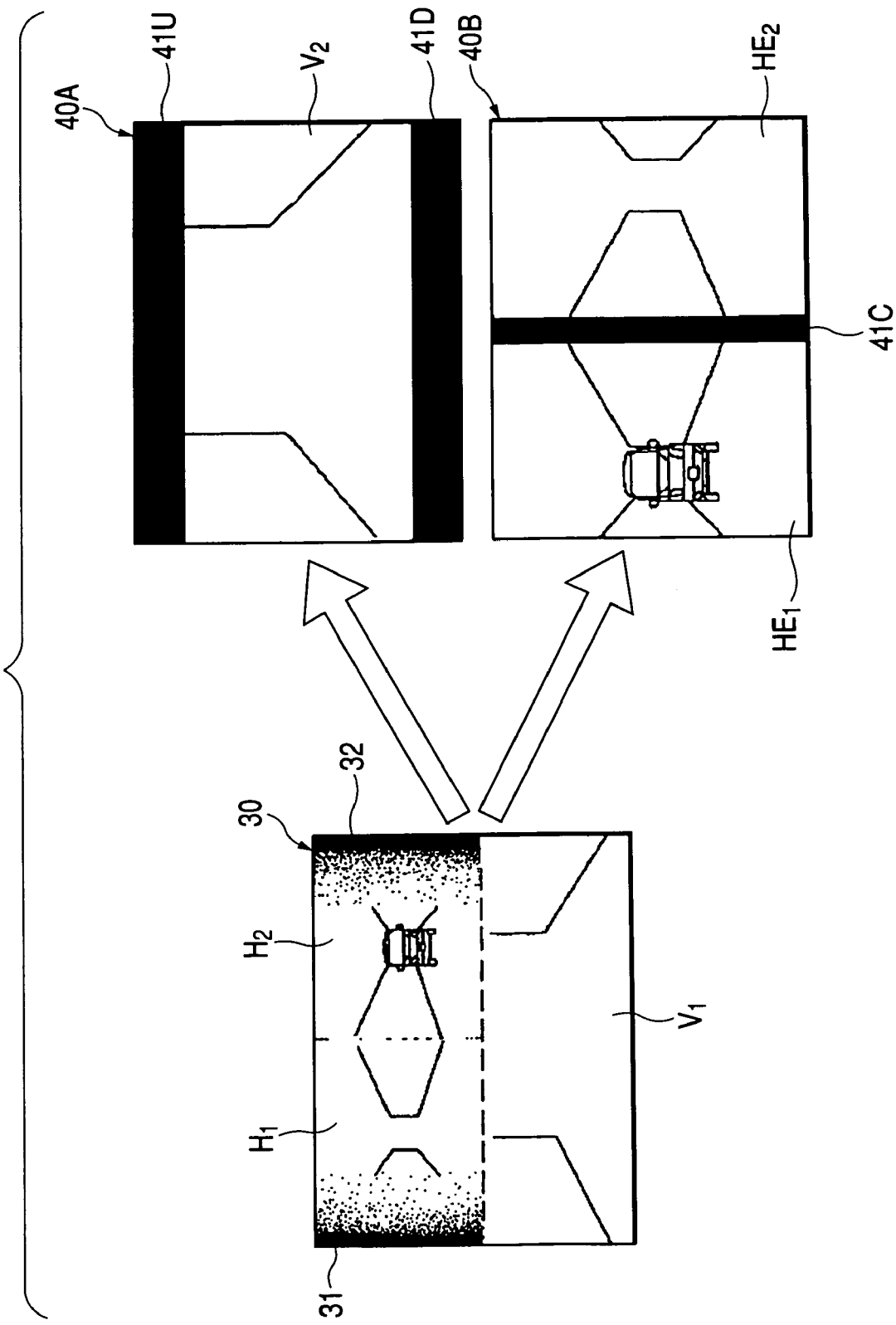
FIG. 3 is a schematic drawing to show an image picked up by the image pickup unit of the vehicle periphery visual recognition system according to the first embodiment of the invention and a front lower image and front left and right images.

Based on the control signals, the switch control section 17 instructs the resolution conversion section 12 to enlarge the image in the lower area $V_1$ in the picked-up image 30 (FIG. 3) at a predetermined scaling factor in the vertical direction and instructs the inversion processing section 13 not to perform inversion processing. Accordingly, the resolution conversion section 12 executes interpolation processing to enlarge the image signal input from the image pickup unit 11 in the vertical direction, and the inversion processing section 13 does not perform inversion processing of the image signal input from the resolution conversion section 12 and outputs the image signal to the display 15 through the video output section 14. A display image 40A shown in FIG. 3 is an image of the lower area at the front of the vehicle (front lower image) displayed on a display section 16 of the display 15. An image $V_2$ at the center is an image enlarged in the vertical direction by the resolution conversion section 12, and the display position of the image is adjusted so that the image is placed in the up and down center of the display image 40A. Belt-like mask areas 41U and 41D are superposed on the top and bottom ends of the display image 40A to enhance viewability. Thus, the display section 16 of the display 15 displays only the front lower image on an enlarged scale just after the engine of the vehicle is started, so that left and right end areas 31 and 32 in the display image 40A need not be displayed.

Next, the driver changes the shift position from parking to drive to move the vehicle. At this time, the shift position signal input to the switch control section 17 changes from the parking mode to the drive mode. In association with the change in the shift position signal, the switch control section 17 instructs the resolution conversion section 12 to enlarge the images in the left and right areas $H_1$ and $H_2$ in the picked-up image 30 (FIG. 3) at a predetermined scaling factor and also instructs the inversion processing section 13 to perform inversion processing. Accordingly, the resolution conversion section 12 executes interpolation processing to enlarge the images with the left and right end areas 31 and 32 removed in the areas $H_1$ and $H_2$ in the picked-up image 30 at the predetermined scaling factor in the vertical direction and the horizontal direction. The inversion processing section 13 performs left and right inversion processing of the image signal input from the resolution conversion section 12 and outputs the signal provided by performing the inversion processing to the display 15 through the video output section 14. Display image 40B shown in FIG. 3 is images of the left and right side areas of the vehicle (front left and right images) displayed on the display section 16 of the display 15. The image of the left side area of the vehicle is displayed in a left area $HE_1$ of the front left and right images 40B, and the image of the right side area of the vehicle is displayed in a right area $HE_2$. A belt-like separation area 41C for visually separating the left and right areas $HE_1$ and $HE_2$ is superposed on the center of the front left and right images 40B to enhance viewability.

Next, when the driver turns off a parking brake and the vehicle speed becomes 6 km per hour or more, the switch control section 17 performs switch control in association with the vehicle speed sensor signal and the shift position signal so that output of the front left and right images from the video output section 14 is stopped and that a navigation image (not shown) is displayed on the display 15. Using the GPS (Global Positioning System) and various sensors, the vehicle position and its surroundings are displayed on a map on the display 15 and information (accident information, congestion information, parking information, etc.,) provided by the VICS (Vehicle Information Communication System) is displayed on the display 15.

The driver can operate an input unit of a touch panel (not shown), etc., for inputting a changeover switch signal to the switch control section 17 for causing the switch control section 17 to switch the image into any of the front left and right images, the front lower image, or the navigation image.

As described above, the vehicle periphery visual recognition system 1 uses the wide-range lens system 23 having the viewing angle of the horizontal view angle 70 degrees or more. Thus, as shown in FIG. 3, as the picked-up image 30 output by the image pickup device 22, images of light not internally reflected in the prism 20 are contained in the left and right end areas 31 and 32, but the switch control section 17 can select the front left and right images or the front lower image in response to the control signal input from the outside corresponding to the operation state of the vehicle, and can display the selected image on an enlarged scale on the display 15. Therefore, if the wide-range lens system 23 is used, compatibility between enlargement of the visual field range in the vertical direction and good viewability can be provided.

The vehicle periphery visual recognition system 1 according to the embodiment does not require any complicated circuit configuration or image memory and can be realized at low cost.

Second Embodiment

Figure 4:
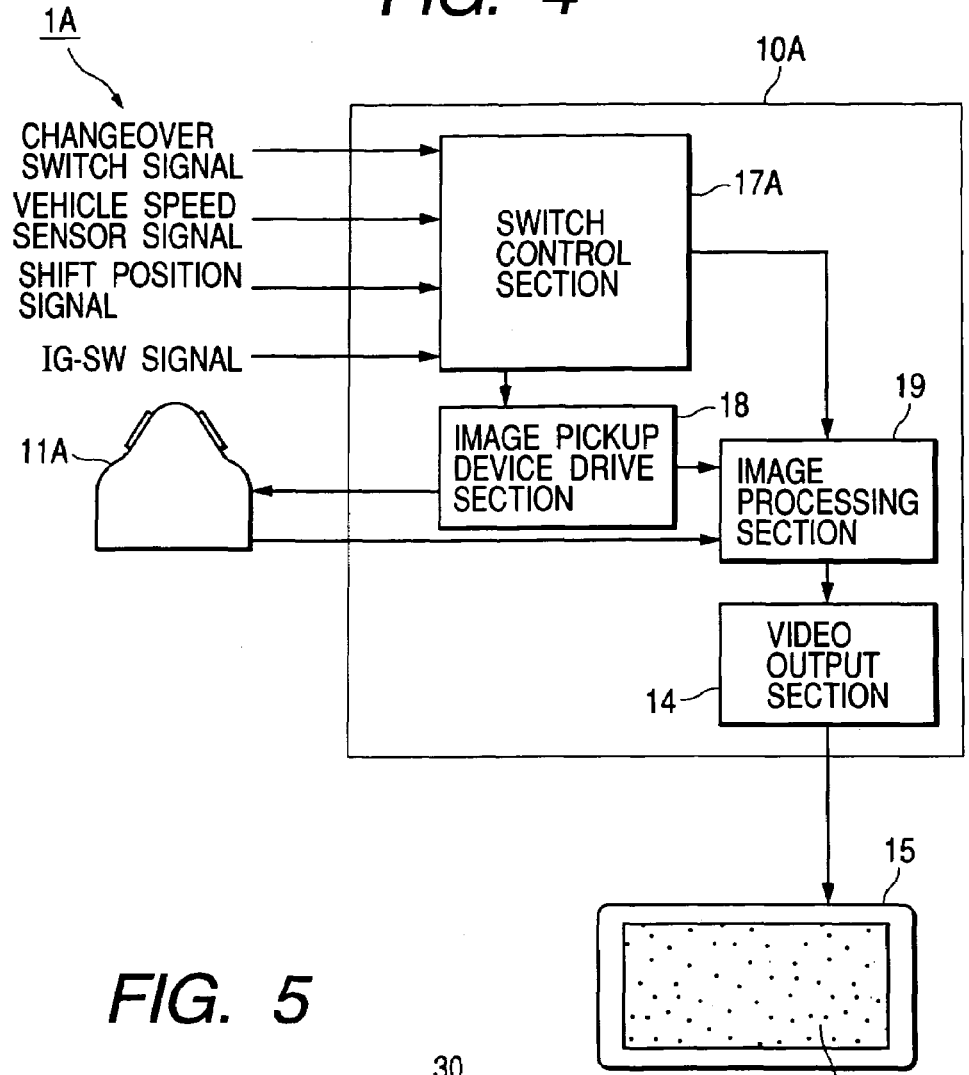
FIG. 4 is a functional block diagram to show a rough configuration of a vehicle periphery visual recognition system according to a second embodiment of the invention.

FIG. 4 is a functional block diagram to show a rough configuration of a vehicle periphery visual recognition system 1A according to a second embodiment of the invention. Functional blocks roughly identical with those previously described with reference to FIG. 1 are denoted by the same reference numerals in FIG. 4 and will not be discussed again in detail.

The vehicle periphery visual recognition system 1A is made up of an image pickup unit 11A and a controller 10A. The image pickup unit 11A has the same configuration as the image pickup unit 11 shown in FIG. 2 except for the resolution of an installed image pickup device. The image pickup device has the effective number of pixels of about 380000 (the number of horizontal pixels is 768 and the number of vertical pixels is 494), and comprises the resolution about 1.5 times in the horizontal direction the resolution of the image pickup device 22 according to the first embodiment.

The controller 10A is made up of a switch control section 17A for controlling an image pickup device drive section 18 based on various control signals (changeover switch signal, vehicle speed sensor signal, shift position signal, and IG SW signal) similar to those in the first embodiment, an image processing section 19 for executing image processing of resolution conversion, etc., and a video output section 14. Thus, the controller 10A does not have a functional block corresponding to the inversion processing section 13 adopted in the first embodiment. Left and right inversion of an image is accomplished by the image pickup device drive section 18 which performs drive control of the image pickup device of the image pickup unit 11A, as described later.

An operation example of the described vehicle periphery visual recognition system 1A will be discussed in detail.

Figure 5:
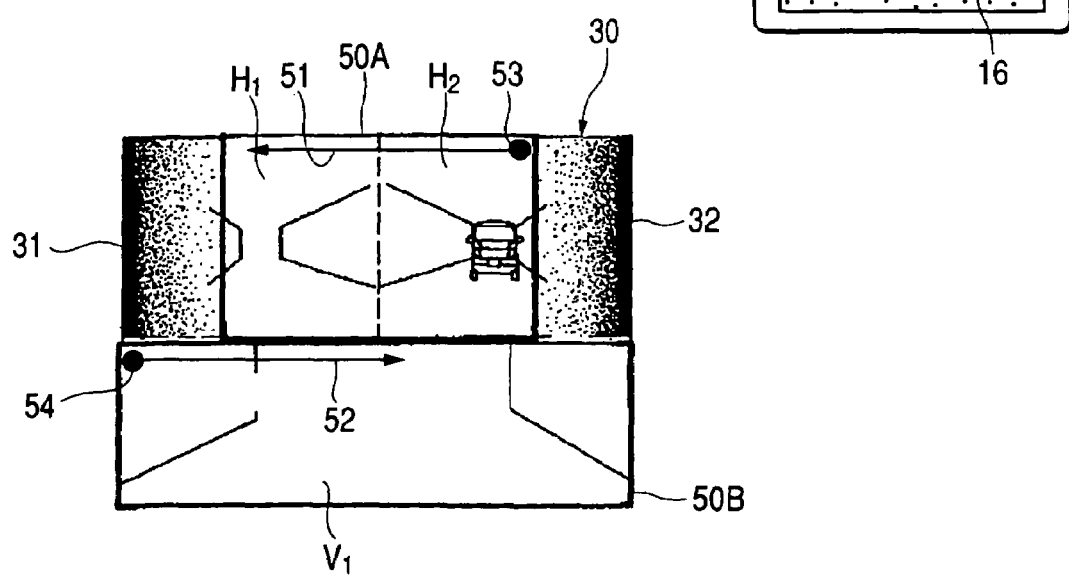
FIG. 5 is a drawing to describe an image pickup device drive method of the vehicle periphery visual recognition system according to the second embodiment of the invention.

Processing of displaying the front lower image 40A shown in FIG. 3 is as follows: The switch control section 17A specifies the pixel data read position of the image pickup device and the read direction for the image pickup device drive section 18 based on the externally input control signals (changeover switch signal, ignition switch signal, etc.,). That is, to read carriers (electrons or holes) accumulated in the pixels of the image pickup device, the image pickup device drive section 18 controls the read range surrounded by a solid line frame 50B of a lower area $V_1$ of a picked-up image 30 shown in FIG. 5, a read start point 54, and a read direction 52. Since the image in the lower area $V_1$ is not left-and-right-inverted, the read direction 52 may be the normal read direction. Accordingly, only the image signal of the lower area $V_1$ can be taken out from the image pickup unit 11A and can be input to the image processing section 19. The image processing section 19 performs interpolation processing for enlarging the input image signal in the vertical direction to generate an enlarged image, and superposes the belt-like mask areas 41U and 41D shown in FIG. 3 on the enlarged image and then outputs the resultant image through the video output section 14 to a display 15.

Next, processing of displaying the front left and right images 40B shown in FIG. 3 is as follows: To read carriers accumulated in the pixels of the image pickup device, the image pickup device drive section 18 controls the read range surrounded by a solid line frame 50A of areas $H_1$ and $H_2$ of the picked-up image 30 shown in FIG. 5, a read start point 53, and a read direction 51 under the control of the switch control section 17A. The read direction 51 results from performing left and right inversion of the normal read direction, and the read range 50A is set to the range excluding end areas 31 and 32 picking up images of light not internally reflected in a prism 20. Accordingly, the image signal resulting from performing left and right inversion of the range surrounded by the solid line frame 50A can be read from the image pickup unit 11A and can be input to the image processing section 19. The image processing section 19 performs interpolation processing for enlarging the input image signal in the horizontal direction to generate an enlarged image, and superposes the separation area 41C shown in FIG. 3 on the enlarged image and then outputs the resultant image through the video output section 14 to the display 15.

As described above, in the vehicle periphery visual recognition system 1A according to the second embodiment, the image pickup device drive section 18 controls the pixel read range of the image pickup device and the pixel read direction, whereby the image signal in any desired pixel range can be directly output from the image pickup device. The image signal can also be left-and-right-inverted for output. Thus, the controller 10A need not have a circuit configuration for performing left and right inversion processing, and the cost of the controller can be reduced.

The horizontal resolution of the image pickup device installed in the image pickup unit 11 is set high as compared with the vertical resolution, so that the quality of the front left and right images 40B shown in FIG. 3 becomes good and high viewability can be provided.

In the first embodiment, the second embodiment, the image pickup unit 11, 11A is disposed so as to pick up images of the front lower area and left and right side areas of the vehicle, but the invention is not limited to such disposition. The image pickup unit 11, 11A may be disposed so as to pick up an image of the rear area of the vehicle. In such a case, to eliminate a sense of incompatibility between the display image on the display 15 and an image displayed on a rear check mirror in the vehicle, it is desirable that control should be performed so that the picked-up image of the rear lower area of the vehicle is left-and-right inverted and picked-up images of left and right side areas at the rear of the vehicle are not left-and-right inverted for output to the display 15.

Third Embodiment

Figure 10:
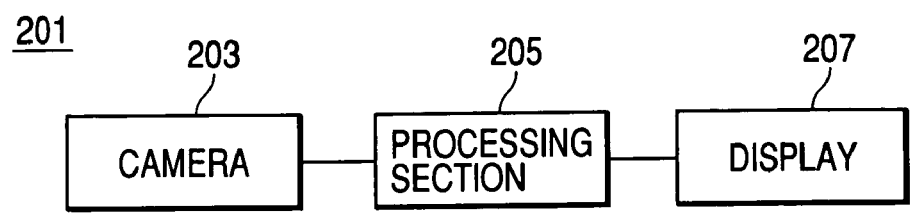
FIG. 10 is a schematic block diagram of a vehicle periphery monitoring apparatus according to a third embodiment of the invention.
Figure 11:
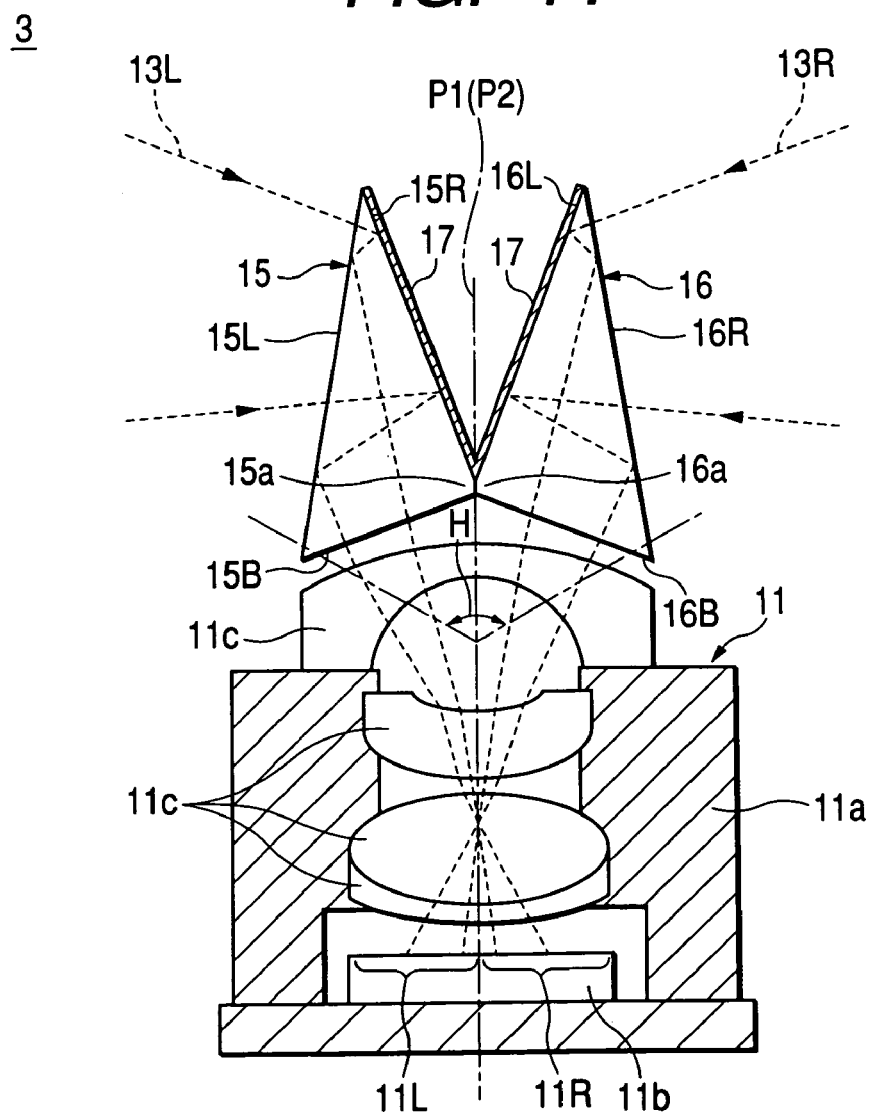
FIG. 11 is a schematic plan view of a camera of the vehicle periphery monitoring apparatus according to the embodiment of the invention.
Figure 12:
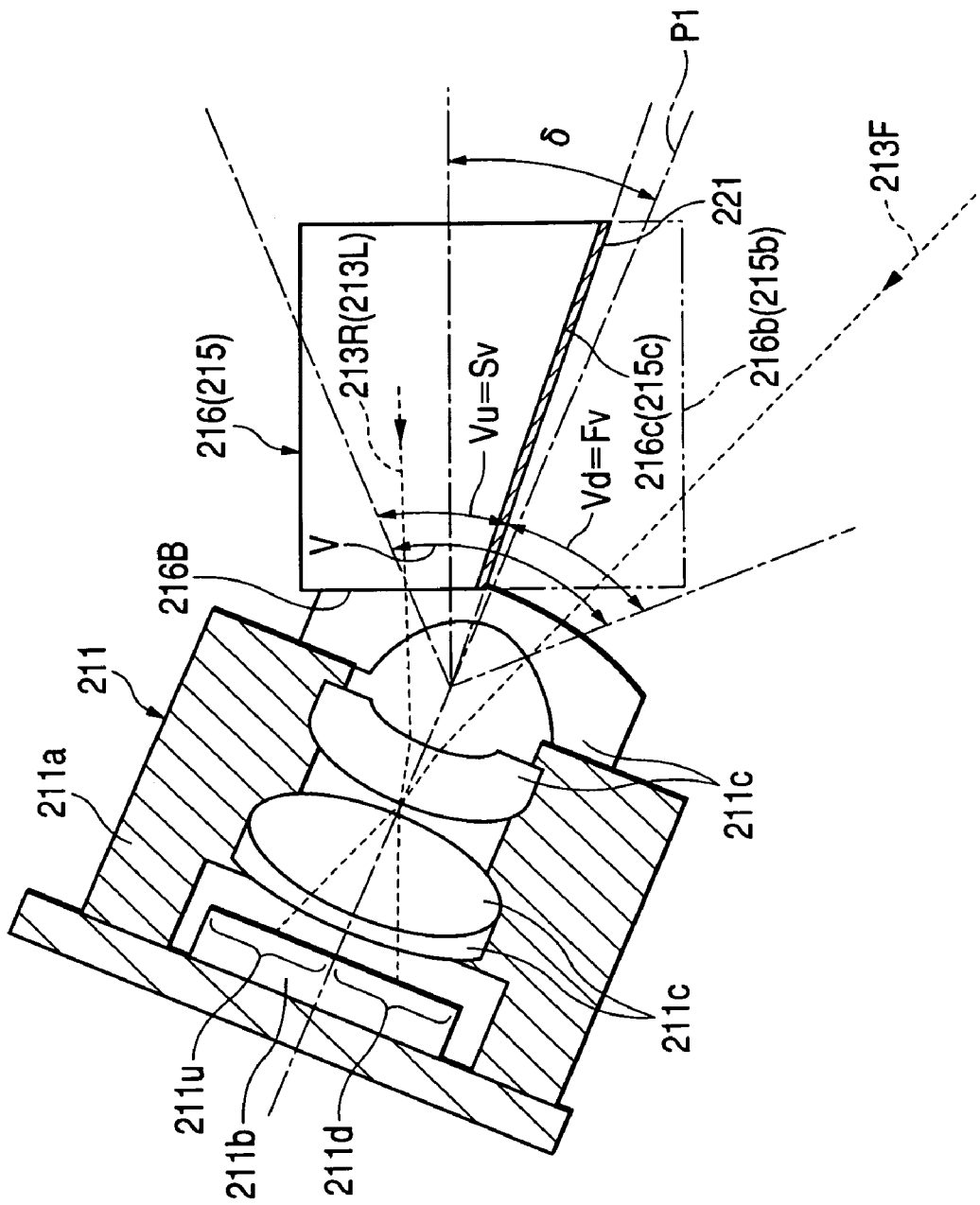
FIG. 12 is a schematic side view of the camera of the vehicle periphery monitoring apparatus according to the embodiment of the invention.
Figure 13:
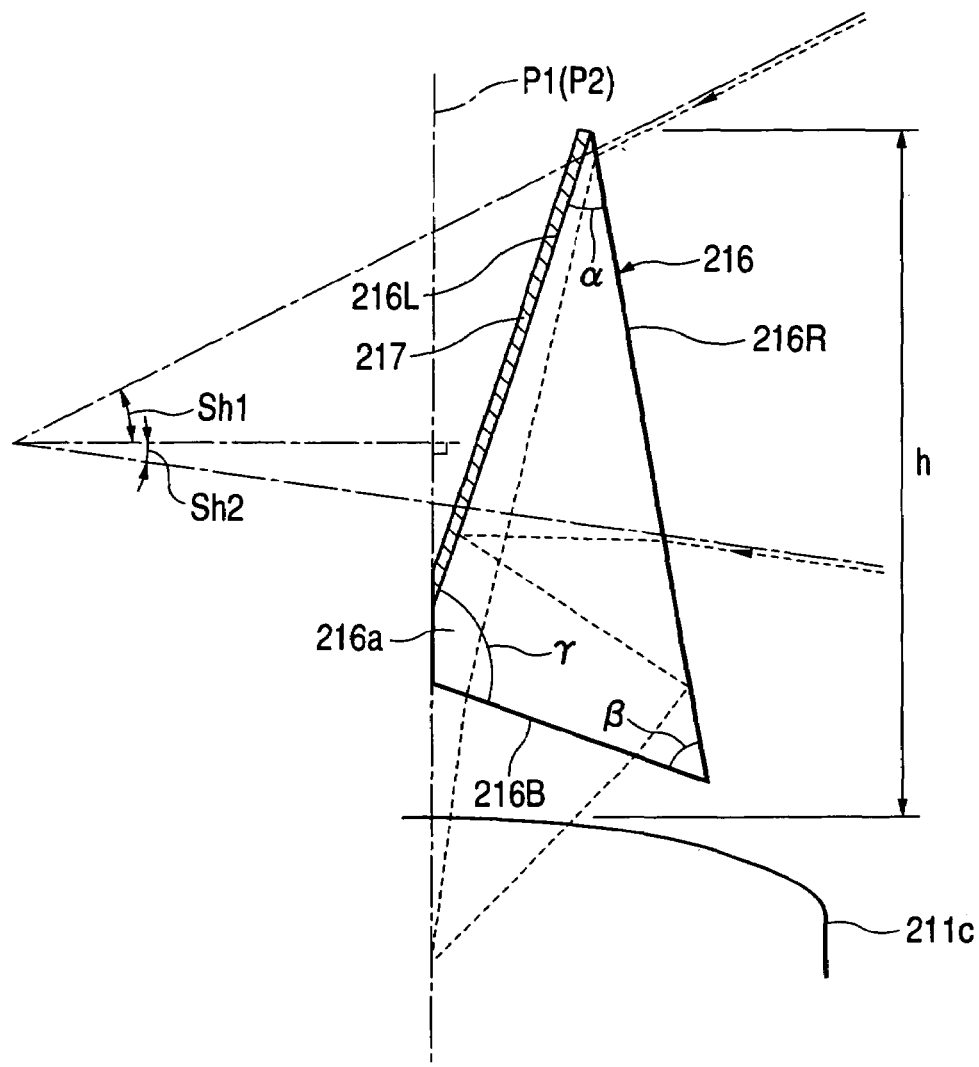
FIG. 13 is an enlarged drawing of a right prism of the camera in FIG. 11.
Figure 14:
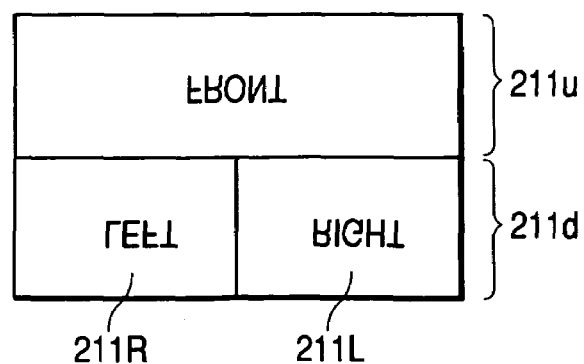
FIG. 14 is a drawing to describe inversion directions of image portions of image picked up by the camera of the vehicle periphery monitoring apparatus according to the embodiment of the invention.
Figure 15:
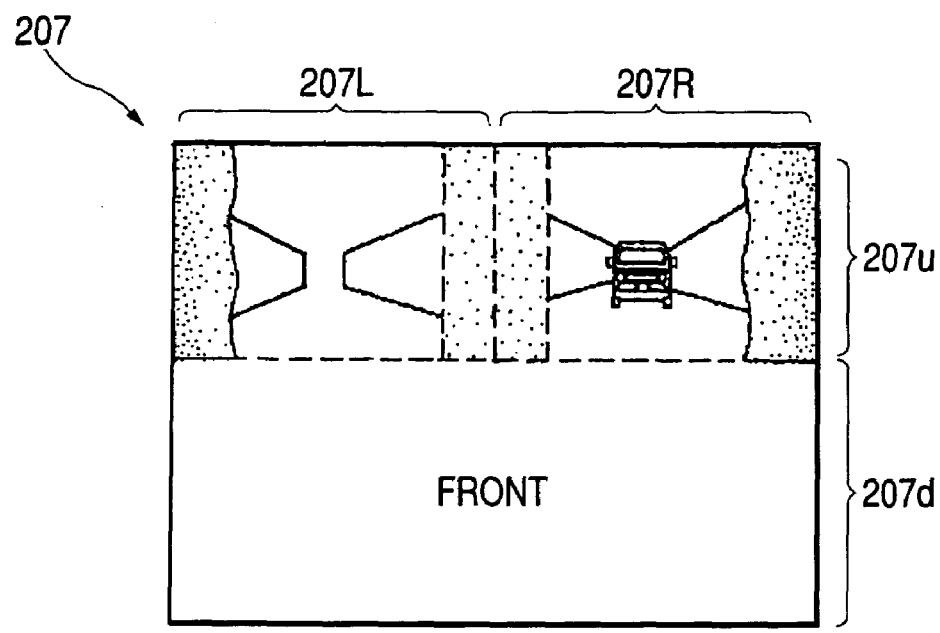
FIG. 15 is a drawing to show an example of a display image before mask processing of the vehicle periphery monitoring apparatus according to the embodiment of the invention.
Figure 16:
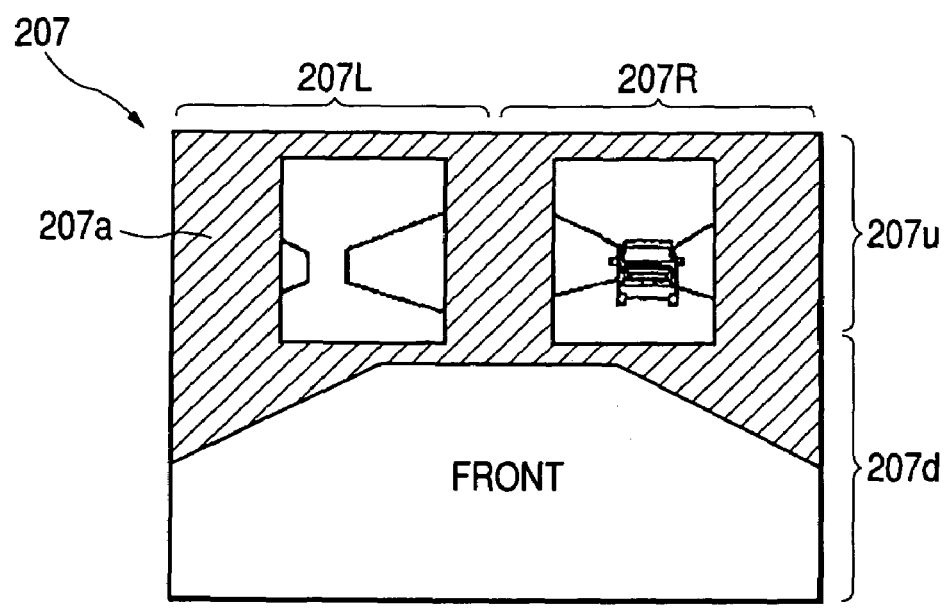
FIG. 16 is a drawing to show an example of a display image after mask processing of the vehicle periphery monitoring apparatus according to the embodiment of the invention.

FIG. 10 is a block diagram of a vehicle periphery monitoring apparatus according to an embodiment of the invention. FIG. 11 is a plan view of a camera portion of the vehicle periphery monitoring apparatus according to the embodiment of the invention. FIG. 12 is a side view of the camera portion of the vehicle periphery monitoring apparatus according to the embodiment of the invention. FIG. 13 is an enlarged plan view of aright prism of the camera. FIG. 14 is a drawing to describe picked-up images of the camera. FIGS. 15 and 16 are drawings to show examples of display images before and after mask processing.

The vehicle periphery monitoring apparatus 201 according to the embodiment is made up of a camera 203 being installed in the vehicle front end part of the lower part of an emblem at the front of a vehicle, etc., for example, for picking up images of visual fields (blind spot areas) in three directions of the front vicinity and the left and right of the vehicle, a processing section 205 for processing the images picked up by the camera 203, and a display 207 being installed in a cabin for displaying the images processed by the processing section 205, as shown in FIG. 10.

The camera 203 is made up of a camera main unit (image pickup means) 211 and a pair of prisms 215 and 216 being placed at the front of the camera main unit 211 for twice internally reflecting light 213L and light 213R from the left and right visual fields in the prisms to make optical path change to the camera main unit 211, as shown in FIGS. 11 and 12.

The camera main unit 211 has a case 211a housing a single image pickup device 211b and image pickup lenses 211c being placed at the front of the image pickup device 211b with a lens optical axis P1 matched in the image pickup direction of the image pickup device 211b. A wide-angle lens is used as the image pickup lens 213c. For example, a wide-angle lens having a horizontal view angle H of 70 degrees or more (here, for example, 120 degrees) and a vertical view angle V of 90 degrees is used.

In the camera main unit 211, an upper half area Vu of the vertical view angle V is used to input light 213L and light 213R from the left and right visual views with optical paths changed through the prisms, and a lower half area Vd of the vertical view angle V is used to input light 213F directly incident from the front visual view without the intervention of the prisms 215 and 216. The camera main unit 211 is placed with the image pickup direction (namely, the lens optical axis P1) directed toward the vehicle front and inclined downward. Accordingly, the light 213F from the front visual view sufficiently on this side of the vehicle (blind spot area) can be input to the lower half area Vd and an image of front scenery of the blind spot area can be picked up. Here, for example, the image pickup direction P1 is inclined downward at depression angle $\delta$=about 25 degrees, the upper half area Vu of the vertical view angle V is set to about 40 degrees, and the lower half area Vd of the vertical view angle V is set to about 50 degrees.

A pair of prisms 215 and 216 is formed of glass material, etc., roughly like a triangle pole having the mirror image relationship, as shown in FIGS. 11 to 13. The pair of prisms 215 and 216 is placed symmetrically with respect to a vertical bisector P2 of the image pickup lenses 211c at the front of the image pickup lenses 211c. Each prism 215 (216) is held in vertical attitude and vertical angle $\alpha$ and prism back face 215B (216B) are directed toward the front side and the image pickup lenses 211c. Here, the left (right) prism 215 (216) changes the optical path of the light 213L (213R) incident from the left (right) visual field. That is, the left (right) prism 215 (216) has a left (right) prism side 215L (216R) as a light incidence plane, a right (left) prism side 215R (216L) as a reflection plane, and a prism rear 215B (216B) as alight emission plane.

Metal 217 of aluminum, etc., for example, is evaporated on the reflection plane 215R, 216L of the prism 215, 216 so that the inner face becomes a mirror surface and further a protective film (not shown) is formed in black paint so as to cover the evaporation face.

Figure 17:
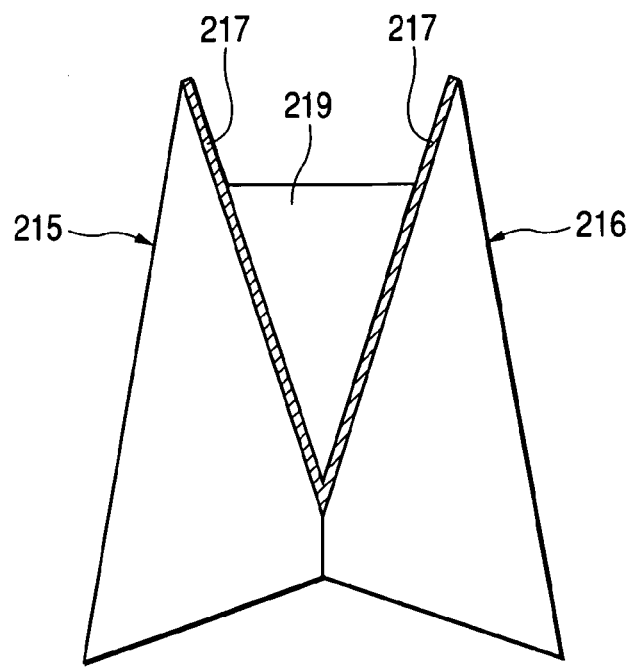
FIG. 17 is a drawing to show a modification of the joint state of prisms in the camera of the vehicle periphery monitoring apparatus according to the embodiment of the invention.

The prisms 215 and 216 have chamfered diagonal parts 215a and 216a opposed to the light incidence planes 215L and 216R and are joined with an adhesive, etc., on the chamfered faces and are formed in one piece. Accordingly, the angle adjustment between the prisms 215 and 216 at the assembling time can be omitted for increasing efficiency of the assembling. At this time, as shown in FIG. 17, a spacer 219 may be inserted between the reflection planes 215R and 216L of the prisms 215 and 216 for bonding, thereby reinforcing the joint of the prisms 215 and 216.

Here, for example, each prism 215, 216 is formed roughly like a triangle pole with vertical angle $\alpha$=28 degrees, opposite angle to the reflection plane 215R, 216L, $\beta$=60 degrees, and opposite angle to the light incidence plane 215L, 216R, $\gamma$=92 degrees, and is formed to a dimension within prism use area (spacing between the prism front end and the image pickup lens 11c front) h=13.6 mm, as shown in FIG. 13.

In each prism 215, 216, a portion 215b, 216b projected to the lower half area Vd of the vertical view angle V is cut so that the prism 215, 216 is placed within the upper half area Vu of the vertical view angle V of the image pickup lens 211c, as shown in FIG. 12. Accordingly, blocking the incidence optical path of the light 213F from the front visual field is prevented.

Light shield treatment 221 is applied to the cut face 215c, 216c of each prism 215, 216. Specifically, the cut face 215c, 216c is made rough by abrasive blasting, etc., and black paint having a high refractive index is applied to the cut face 215c, 216c. Accordingly, internal light reflection, external light reflection on the cut face (namely, the prism bottom) 215c, 216c is prevented and a ghost image occurring as the light 213L, 213R (213F) from the left, right (front) visual field is internally reflected (externally reflected) on the prism bottom 215c, 216c, is incident on the image pickup lenses 211c, and formed as an image on the image pickup device 211b can be prevented.

That is, in the configuration, as shown in FIGS. 11 and 14, the light 213L (213R) from the left (right) visual field is incident on the prism side 215L (216R) on the visual field side of the prism 215 (216) on the visual field side and is internally reflected on the prism side 215R (216L) on the opposite visual field side in the prism and next is totally reflected on the internal face of the prism side 215L (216R) on the visual field side and is twice left-and-right inverted and then is emitted from the prism rear 215B (216B) and passes through the image pickup lenses 11c for up and down and left and right inversion. Then, the light is formed as an inverted mirror image in a right (left) half area 211R (211L) of a lower half area 11d of the image pickup face of the image pickup device 211b. On the other hand, the light 213F from the front visual field passes directly through the image pickup lenses 211c for up and down and left and right inversion without the intervention of the prism 215, 216, and is formed as an inverted mirror image in an upper half area 211u of the image pickup face of the image pickup device 211b, as shown in FIGS. 12 and 14. That is, in the camera, the visual fields in the three directions of the left and right and the front are inverted in one direction and images are formed on the image pickup device 211b at the same time. FIG. 14 is a drawing of the image pickup face of the image pickup device 211b viewed from the image pickup lens 211c side.

In the numerical value setting described above, the image pickup range of the left and right visual fields is as follows: First-half horizontal view angle Sh1=28 degrees, latter-half horizontal view angle Sh2=7.5 degrees, and vertical view angle Sv (upper half area Vu of vertical view angle V)=40 degrees with reference to FIGS. 12 and 13, and the image pickup range of the front visual field is as follows: Horizontal view angle Fh (horizontal view angle H)=120 degrees and vertical view angle Fv (upper half area Vd of vertical view angle V)=50 degrees with reference to FIGS. 11 and 12; practically sufficient range is covered.

The processing section 205 performs all-area inversion processing in batch for the images picked up by the image pickup device 211b to provide erect images, and displays the erect images on the display 207. Accordingly, as shown in FIG. 15, the left visual field, the right visual field, and the front visual field are displayed as erect images in a left half area 207L of an upper half area 207u of a display screen of the display 207, a right half area 207R of the upper half area 207u, and a lower half area 207d.

At the time, as shown in FIG. 16, the processing section 205 superposes a mask image 207a on an unnecessary portion of the images picked up by the image pickup device 211b for display on the display 207. In FIG. 16, for example, the mask image 207a is superposed on the margins of the images of the left and right visual fields (disordered image portions formed on the image pickup face without total reflection on the prism side 215L, 216R on the visual field side), and is superposed like chamfer on the upper right and upper left corners of the image of the front visual field so as to easily grasp perspective. Accordingly, the display image is well seen and viewability is enhanced.

Image memory and an image processing function may be added to the processing section 205 as required and processing of enlarging the necessary portion of the image picked up by the image pickup device 211b (normal portion without disorder), etc., may be combined for display. Accordingly, the display image is still better seen and viewability is enhanced.

According to the described vehicle periphery monitoring apparatus 201, the prisms 215 and 216 for making optical path change by twice internally reflecting light between the prism sides 215R and 216L on the opposite visual field side and the prism sides 215L and 216R on the visual field side are used to change the optical paths of the light 213L and the light 213R from the side visual fields (here, the left and right visual fields) to the image pickup lens 211c side, so that the optical path change can be made without mirror-image inverting of the light 213L and the light 213R from the side visual fields. Therefore, the images of the side visual fields input through the prisms 215 and 216 and the front visual field input without the intervention of the prisms 215 and 216 can be picked up by the single image pickup device 211b at the same time with the inversion directions matched. Thus, the need for performing partial inversion processing for the images picked up by the image pickup device 211b for matching the inversion directions of the image portions of the front visual field and the side visual fields as in the related art is eliminated and the signal processing circuit configuration can be simplified.

Further, the prisms 215 and 216 are placed symmetrically in a pair at the front of the image pickup lenses 211c, the left prism side 215L of the left prism 215 is directed to the left visual field, and the right prism side 216R of the right prism 216 is directed to the right visual field, so that the images of the left and right side visual fields can be picked up at the same time with the inversion directions matched.

Further, metal is evaporated on the prism sides 215R and 216L on the opposite visual field sides of the prisms 215 and 216, so that the prism sides 215R and 216L on the opposite visual field sides can be made mirror surfaces to ensure total reflection.

Further, wide-range lenses are used as the image pickup lenses 211c, so that if images of a plurality of side visual fields are picked up at the same time, the images can be picked up over the practically sufficient range.

In the embodiment, the case where the two prisms 215 and 216 are used to pick up images of the left and right side visual fields has been described, but one prism may be used to pick up an image of one side visual field or three or more prisms may be used to pick up images of three or more side visual fields.

In the embodiment, the left and right prisms 215 and 216 are separately formed of glass and are joined to each other with an adhesive, etc., for forming the prisms 215 and 216 in one piece. However, the left and right prisms 215 and 216 may be formed in one piece from the beginning with resin of optical transparent resin PMMA, etc.

Figure 18:
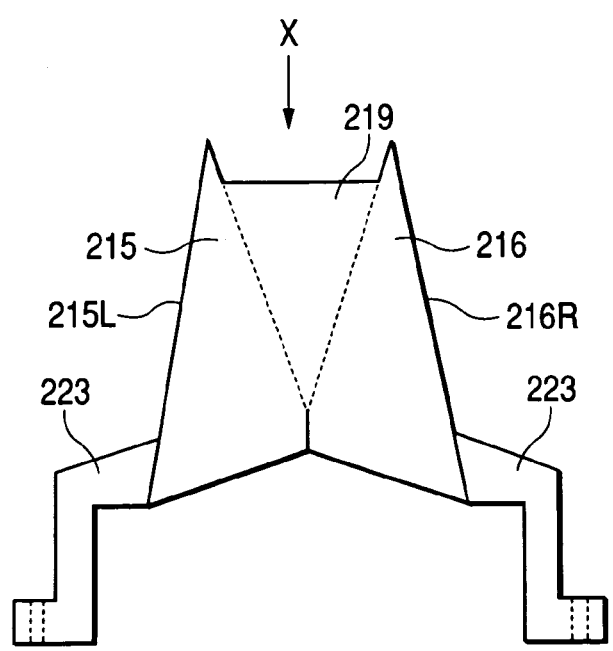
FIG. 18 is a plan view of a modification to form a prism holder integrally with prisms in the camera of the vehicle periphery monitoring apparatus according to the embodiment of the invention.
Figure 19:
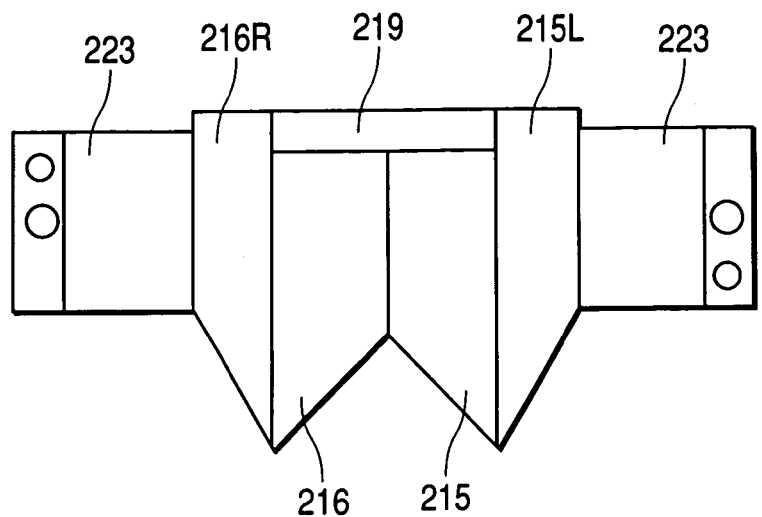
FIG. 19 is a drawing of the modification viewed from arrow X direction in FIG. 18.
Figure 20:
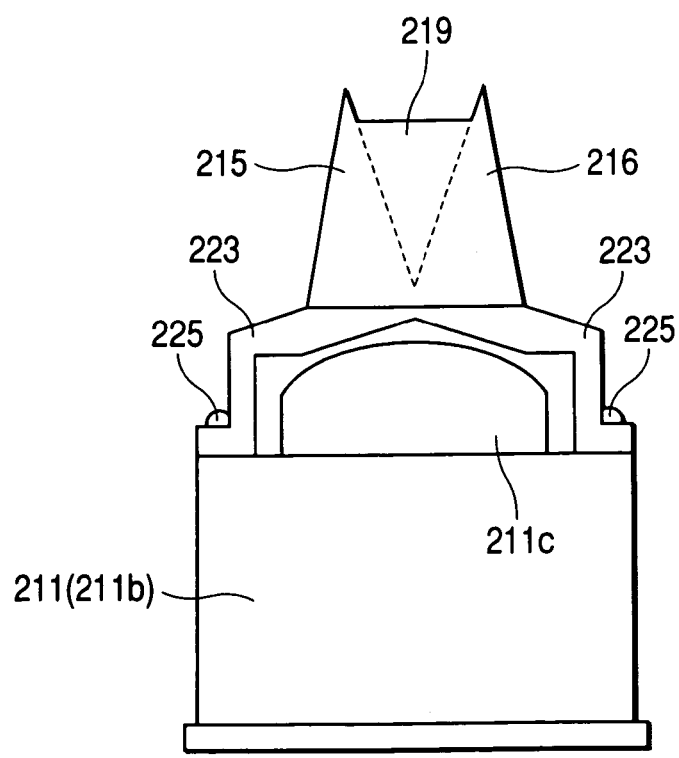
FIG. 20 is a drawing to show a state in which the prisms in FIG. 18 are fixed to the camera main unit.

Further, as shown in FIGS. 18 to 20, prism 215 and 216 portions are formed of resin of PMMA, etc., a prism holder 223 portion (fixed part) is formed of opaque resin of PC (polycarbonate) containing a glass filler or the like, whereby the prisms 215 and 216 and the prism holder 223 may be formed in one piece in two colors, for example. Accordingly, attachment work of the prism holder 223 can be omitted and the number of parts can be reduced. In FIGS. 18 to 20, the prism holder 223 is extended from the rear end portions of prism sides 215L and 216R on the visual field sides, for example, of the prisms 215 and 216 to the rear, and are fixed to case 211b of camera main unit 211 by screws 225, etc., for example, and further spacer 219 is also formed of opaque resin of PC containing a glass filler, PMMA, or the like integrally with the prisms 215 and 216.

Figure 21:
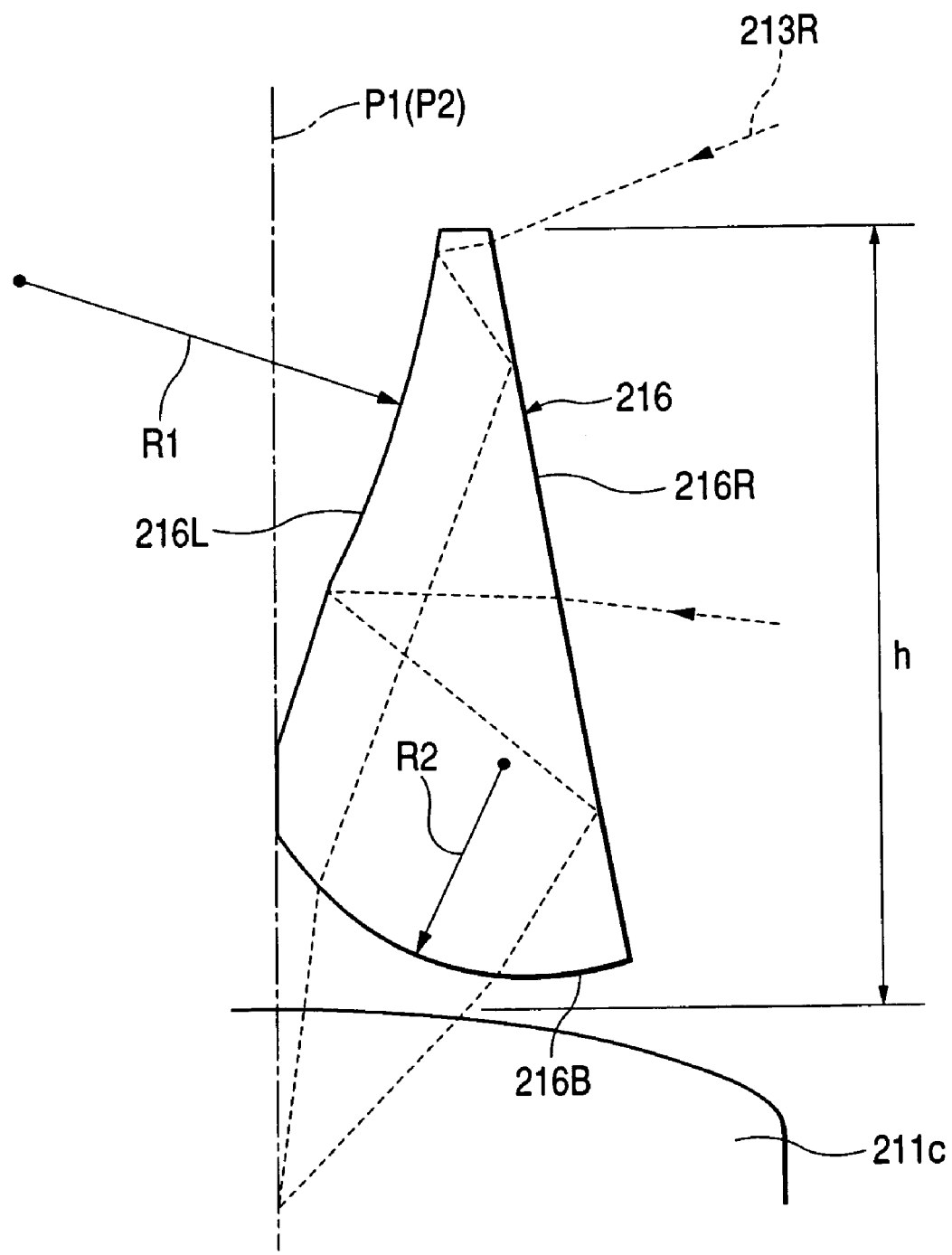
FIG. 21 is a drawing to describe a modification concerning the shape of the prism faces of the prism in the camera of the vehicle periphery monitoring apparatus according to the embodiment of the invention.

In the embodiment, the prisms 215 and 216 having the prism faces (back faces 215B and 216B and sides 215L, 215R, 216L, and 216R) all formed as flat faces are used, but at least one of the prism faces may be made a curved surface, and the curved surface and other faces may be used in combination. Accordingly, while the image pickup ranges of the left and right visual fields are held to the same extent, the prisms 215 and 216 can be more miniaturized. For example, as shown in FIG. 21, if the prism side 215R, 216L on the opposite visual field side is formed partially with a concave curved surface with curvature radius R1=16.6 mm and the prism back face 215B, 216B is formed with a convex curved surface with curvature radius R2=4.0 mm, prisms use area h can be reduced to h=11.8 mm.

In the embodiment, the camera 203 is installed at the front of the vehicle for picking up the images of the three-direction visual fields of the visual fields in the left and right directions of the vehicle and the visual field in the travel direction. However, the camera 203 may be installed at the rear of the vehicle for picking up images of three-direction visual fields of the visual fields in the left and right directions of the vehicle and the visual field in the back direction; of course, the camera 203 may be installed at any other position of the vehicle for picking up images of any desired visual fields.

Forth Embodiment

Figure 22:
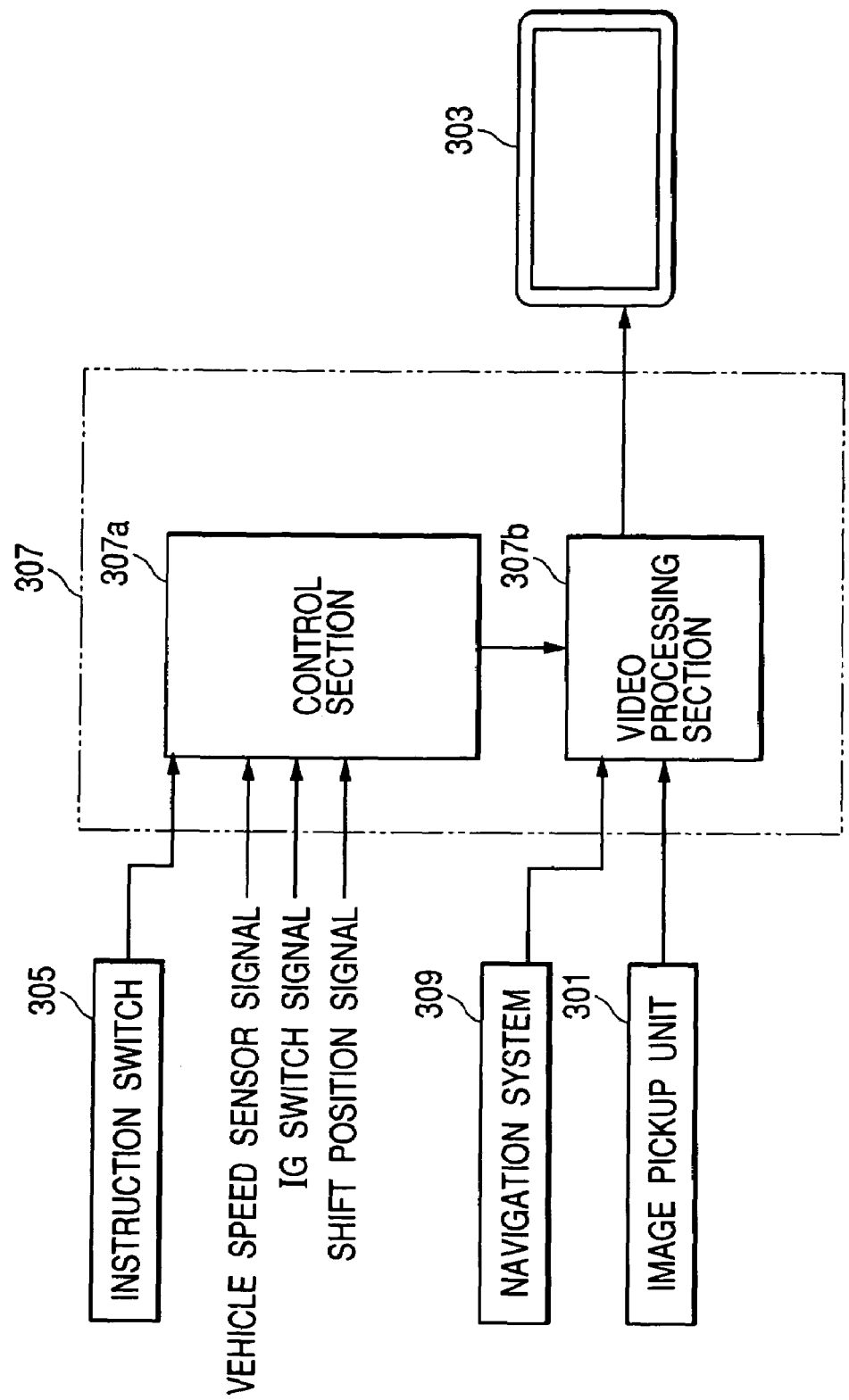
FIG. 22 is a block diagram of a vehicle periphery monitoring system according to a forth embodiment of the invention.
Figure 24:
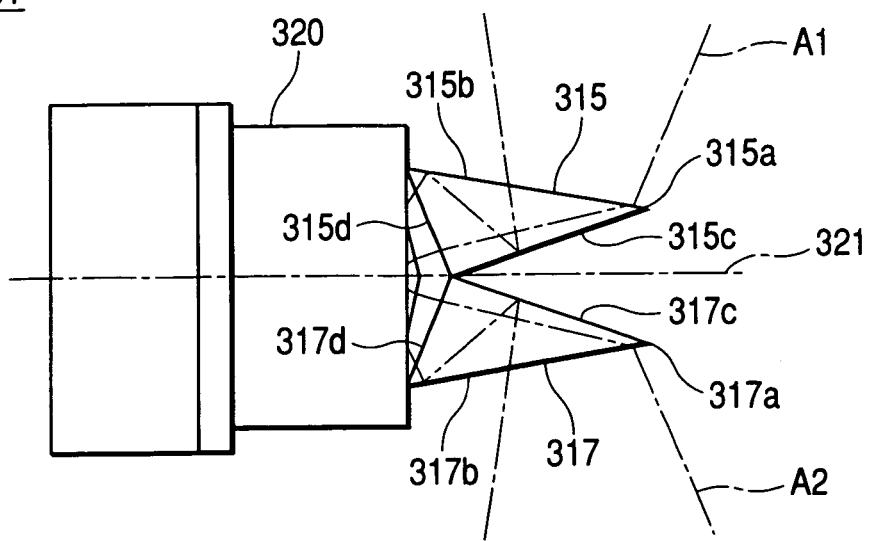
FIG. 24 is a drawing to show the plane configuration of the main part of the image pickup unit.

FIG. 22 is a block diagram of a vehicle periphery monitoring system according to a forth embodiment of the invention. FIG. 22 is a schematic drawing to show the configuration of the longitudinal cross section of an image pickup unit. FIG. 24 is a drawing to show the plane configuration of the main part of the image pickup unit.

As shown in FIG. 22, the vehicle periphery monitoring system comprises an image pickup unit (image pickup means) 301 being installed in the front end part of a vehicle for picking up images of an image pickup area A1 in the left direction at the front of the vehicle (see FIG. 25), an image pickup area A2 in the right direction (see FIG. 25), and an image pickup area A3 in the slanting down direction (see FIG. 25), a display 303, an instruction switch (operation input acceptance means) 305, and a control unit (control means) 307.

Figure 23:
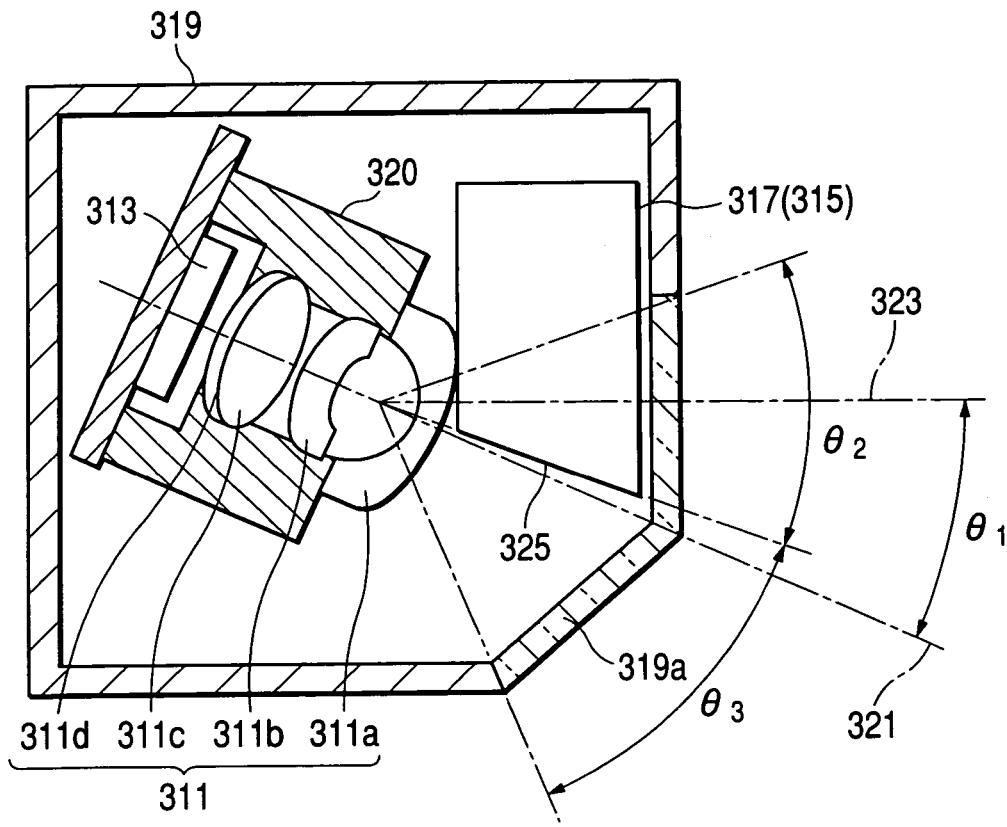
FIG. 23 is a schematic drawing to show the configuration of the longitudinal cross section of an image pickup unit.

As shown in FIGS. 23 and 24, the image pickup unit 301 comprises a wide-range lens system 311, an image pickup device section 313, two prisms 315 and 317 as reflection means for reflecting light in the left and right directions and introducing the reflected light into the wide-range lens system 311, and a case 319 for housing the components. The image pickup unit 301 is installed in the front end part of the vehicle (for example, the lower part of an emblem, etc.,) for picking up images of the image pickup area A1 in the left direction at the front of the vehicle (see FIG. 25), the image pickup area A2 in the right direction (see FIG. 25), and the image pickup area A3 in the slanting down direction (see FIG. 25). The wide-range lens system 311 and the image pickup device section 313 make up an image pickup section 320.

The wide-range lens system 311 is made up of lenses 311a to 311d and has a horizontal view angle of 90 degrees and a vertical view angle of 70 degrees. The wide-range lens system 311 is installed with the incidence side directed toward the front of the vehicle and is set so that an image pickup optical axis 321 of the wide-range lens system 311 forms a predetermined angle θ1 (here, about 15 degrees) slantingly downward with respect to a horizontal direction 323.

As shown in FIG. 24, the prisms 315 and 317 are shaped each like a triangle in cross section and are placed upright along an up and down direction so as to become symmetrical with respect to the image pickup optical axis 321 at the front of the wide-range lens system 311 with any corner 315a, 317a of the triangle directed toward the front of the vehicle. A first side 315b, 317b of each prism 315, 317 is a light incidence plane for accepting light, a second side 315c, 317c is subjected to mirror work (an aluminum film is evaporated and a protective film is formed in black paint on the aluminum film) to make a mirror face, and a third side 315d, 317d is a light emission plane for emitting light. A light shield member (containing a light shield film) 325 is given to the lower bottom of the prism 315, 317.

The prism 315, 317 accepts light from the left, right image pickup area A1, A2 from the first side 315b, 317b, reflects the light on the second side 315c, 317c subjected to mirror work toward the first side 315b, 317b, and totally reflects the light on the first side 315b, 317b toward the wide-range lens system 311 and then emits the light from the third side 315d, 317d.

The prisms 315 and 317 have lower end faces inclined in the slanting down direction toward the front of the vehicle and are placed so as to cover the area at a predetermined angle θ2 (here, 40 degrees) from the top of the total vertical view angle of the wide-range lens system 311.

Figure 25:
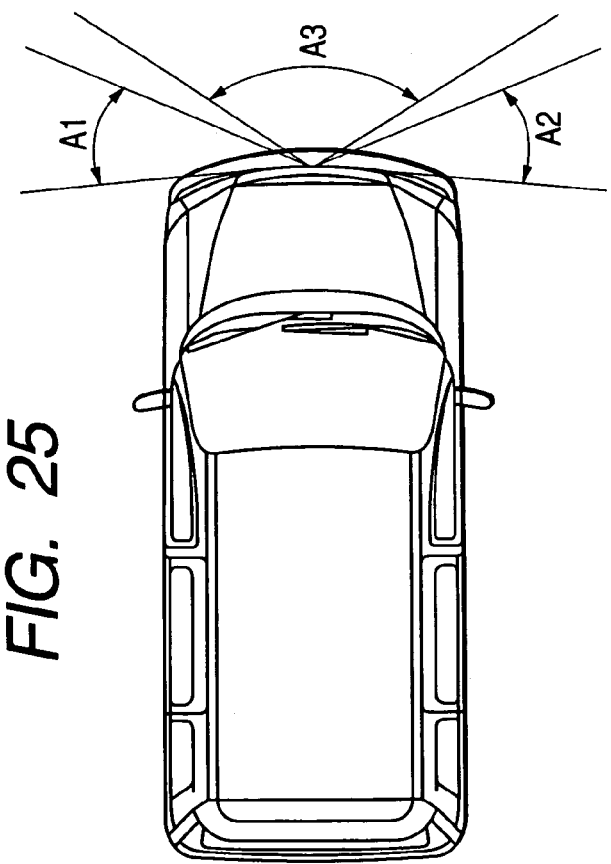
FIG. 25 is a drawing to show image pickup areas of the image pickup unit.
Figure 26:
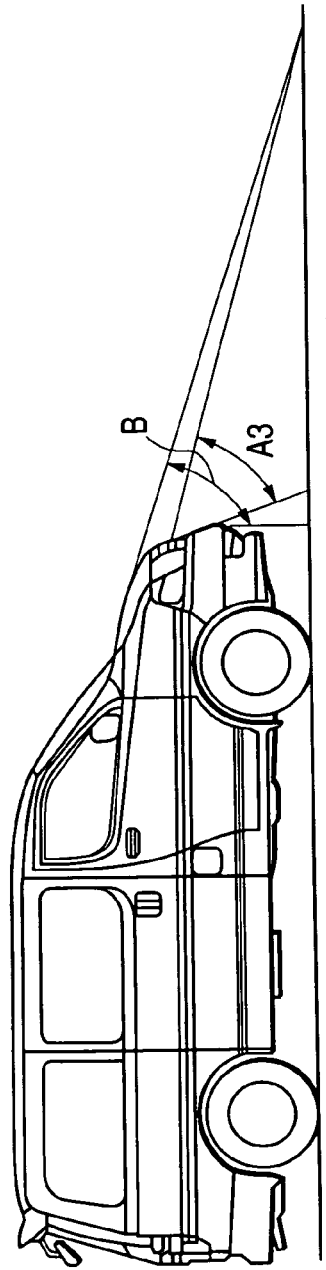
FIG. 26 is a drawing to show the image pickup area of the image pickup unit.

Thus, light from the left and right image pickup areas A1 and A2 is incident through the prisms 315 and 317 on the range of the predetermined angle θ2 (40 degrees) from the top of the vertical view angle (70 degrees) of the wide-range lens system 311, and light from the image pickup area A3 at the front of the vehicle without the intervention of the prisms 315 and 317 is incident on the remaining angle θ3 (30 degrees) on the lower side of the vertical view angle. Accordingly, images of the light from the left and right image pickup areas A1 and A2 and the light from the image pickup area A3 in the slanting down direction at the front are formed through the wide-range lens system 311 in different areas of the image pickup device section 313 so that they do not overlap each other, and the images of the image pickup areas A1 to A3 in the three directions of the left and right directions and the slanting down direction at the front shown in FIGS. 25 and 26 are picked up at a time by the single image pickup device section 313. For example, as the image of the image pickup area A3 in the slanting down direction at the front is picked up, an image of a blind spot area B in the proximity of the front end part of the vehicle at the front of the vehicle blocked by the front nose of the vehicle can be picked up precisely.

The image pickup device section 313 comprises at least one image pickup device. It receives light from the wide-range lens system 311, picks up images of the three-direction image pickup areas A1 to A3, and outputs the picked-up images (video signals) to the control unit 307.

The case 319 is formed with through hole parts 319a for taking light from the three-direction image pickup areas A1 to A3 into the case 319.

The display 303, which is implemented as a liquid crystal display, etc., is installed in a cabin and displays an image picked up by the image pickup unit 301, a navigation image, operation information, etc., under the control of a video processing section 307b of the control unit 307 described later. The image of the image pickup area A1 in the left direction is displayed in an upper-left display area C1 of three display areas C1 to C3 set in a display screen 303a of the display 303 (see FIG. 27A, the image of the image pickup area A2 in the right direction is displayed in an upper-right display area C2, and the image of the image pickup area A3 in the slanting down direction at the front is displayed in a lower display area C3.

The instruction switch 305 accepts operation input to give a switch instruction of the display mode of the images of the image pickup areas A1 to A3 in the display areas C1 to C3 of the display 303. In the embodiment, for example, the instruction switch 305 enables the user to enter a command for displaying the images of all the image pickup areas A1 to A3 (all area display command) with a single motion (press operation, etc.,).

A navigation system (vehicle-installed information apparatus) 309 has a function of detecting the current position of the vehicle based on a GPS signal received from a satellite, a function of searching for a route from the detected current position to the destination entered through an operation input section (not shown) using a contained map database (not shown), and a function of creating a navigation image (map image, etc.,) for guiding the driver along the found route as a recommended route and outputting the navigation image to external display means (for example, the display 303 through the control unit 307).

The control unit comprises a control section 307a and the above-mentioned video processing section 307b, as shown in FIG. 22. The video processing section 307b displays the image picked up by the image pickup unit 301 and the navigation image provided by the navigation system 309 on the display 303 in various display modes (described later) under the control of the control section 307a.

The control section 307a controls the vehicle periphery monitoring system (particularly, controls the display contents of the display 303 produced through the video processing section 307b) based on the command contents entered through the instruction switch 305 and various signals indicating the operation state of the vehicle. In the embodiment, the signals indicating the operation state of the vehicle, input to the control section 307a include an IG switch signal indicating the state of an ignition switch, a vehicle speed sensor signal indicating the vehicle speed, a shift position signal indicating the setup state of a shift position, and the like.

Figure 27A:
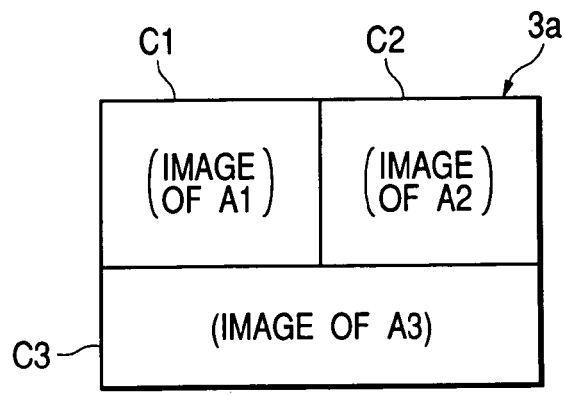
FIGS. 27A to 27C are drawings to show display modes of a display.

Specifically, when the control section 307a detects the engine starting based on the IG switch signal and detects the shift position being changed from the parking position to the drive position based on the shift position signal, if the vehicle periphery monitoring system is started at the time, the control section 307a controls the video processing section 307b, thereby displaying the images of all the image pickup areas A1 to A3 in the corresponding display areas C1 to C3 as shown in FIG. 27A, and this display mode is held until the vehicle speed reaches predetermined speed (here, 10 km per hour) or more. Accordingly, the driver, etc., can check the vehicle front for safety from the display images in the vehicle periphery.

When the control section 307a detects the vehicle speed reaching the predetermined speed or more based on the vehicle speed sensor signal, the control section 307a controls the video processing section 307b, thereby stopping displaying the images of all the image pickup areas A1 to A3 in the display areas C1 to C3 and instead displaying the navigation image provided by the navigation system 309 on the full display screen 303a. In this case, an image of superposing the navigation image (different image) on the images of the image pickup areas A1 to A3 is displayed on the display screen 303a for making it impossible to visually recognize the images of the image pickup areas A1 to A3, thereby stopping displaying the images of the image pickup areas A1 to A3. As a modification, to stop displaying the images of the image pickup areas A1 to A3 and instead display different image on the display 303, the different image may be displayed on the display 303 in a state in which display output of the image signals of the image pickup areas A1 to A3 is completely stopped without superposing the different image on the images of the image pickup areas A1 to A3.

When the control section 307a detects the vehicle speed falling below the predetermined speed as the vehicle is about to approach an intersection, etc., with the navigation image displayed on the display section 303a as described above, the control section 307a controls the video processing section 307b, thereby changing the display contents in the display areas C1 and C2 from the navigation image to the images of the left and right image pickup areas A1 and A2 with the navigation image held in the display area C3 (in this case, preferably the main part of the navigation image (surrounding area of current position display mark) is displayed in the display area C3). Accordingly, the driver can also see the navigation image while checking the left and right blind spot areas for safety based on the image display in the left and right image pickup areas A1 and A2 at a low-visible intersection, etc.

Figure 27B:
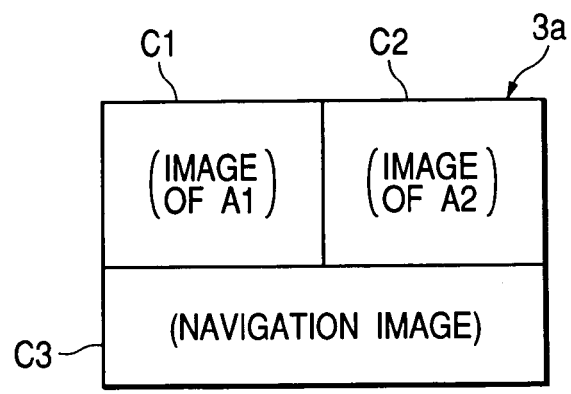

Further, when the control section 307a detects the vehicle speed reaching the predetermined speed or more based on the vehicle speed sensor signal because of the passage of an intersection, etc., with the display mode of the display screen 303a held in the mode shown in FIG. 27B, the control section 307a controls the video processing section 307b, thereby again stopping displaying the images of the image pickup areas A1 and A2 in the display areas C1 and C2 and instead displaying the navigation image provided by the navigation system 309 on the full display screen 303a.

Thus, the control section 307a switches the display mode of the display screen 303a between the display mode of the navigation image on the full display screen 303a and the mode shown in FIG. 27B in response to whether or not the vehicle speed reaches the predetermined speed or more while the vehicle is running.

When the control section 307a accepts entry of an all area display command through the instruction switch 305 in the state in which the vehicle speed is below the predetermined speed as the vehicle arrives at the destination, etc., and the display mode of the display screen 303a is held in the display mode in FIG. 27B, the control section 307a switches the display mode of the display screen 303a from the mode shown in FIG. 27B to the mode shown in FIG. 27A. Accordingly, the driver can check the circumstances surrounding the vehicle in detail at the vehicle stop time, etc. Particularly, the driver can drive the vehicle ahead closely with safety and easily at the parking time, etc., by seeing the image display of the image pickup area A3 in the slanting down direction at the front of the vehicle.

Figure 27C:
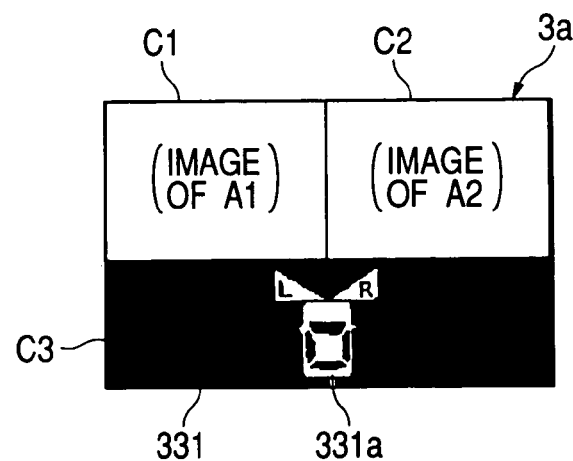

As a modification, in the display mode shown in FIG. 27B, a superposition image 331 as shown in FIG. 27C may be displayed in the display area C3 in place of the navigation image. The superposition image 331 is an image prepared by the video processing section 307b and is superposed on the image in the image pickup area A3 for display in the display area C3. The superposition image 331 contains an image of a symbol mark 331a of two-direction display comprising a mark indicating the display mode of a vehicle periphery image in the two directions of the left and right given to a mark indicating the vehicle shape. Alternatively, a symbol mark of the vehicle periphery monitoring system given to the start switch of the vehicle periphery monitoring system may be displayed in place of the symbol mark 331a.

As described above, according to the embodiment, display of the images of the image pickup areas A1 to A3 can be stopped in response to the operation state of the vehicle and can be displayed only when necessary, and viewability of the vehicle periphery image can be enhanced.

If image display of the image pickup areas A1 to A3 is stopped, the navigation image is displayed instead, so that the display screen 303a of the display 303 can be used effectively.

Further, the driver can monitor the situation of the blind spot areas in the left and right directions at the front of the vehicle and in the slanting down direction at the front as the images of the image pickup areas A1 to A3 in the three directions are displayed.

Since the images of all the image pickup areas A1 to A3 in the three directions are displayed at the vehicle starting time, the driver can check the circumstances surrounding the vehicle in detail.

Fifth Embodiment

FIG. 28 is a block diagram of a vehicle periphery monitoring system according to a fifth embodiment of the invention. The vehicle periphery monitoring system according to the fifth embodiment differs from the vehicle periphery monitoring system according to the forth embodiment substantially in that a navigation apparatus 309 outputs a destination approach signal (described later) to a control unit 307 and that the control contents of the display mode of a display 303 are changed in association with the point. Parts identical with or similar to those previously described with reference to FIG. 22 are denoted by the same reference numerals in FIG. 28 and will not be discussed again.

In the fifth embodiment, as shown in FIG. 28, the navigation apparatus 309 is provided with a function of outputting a destination approach signal to a control section 307a of the control unit 307 when the distance from the current position to the destination becomes a predetermined distance or less in addition to the above-described functions, and the control section 307a controls the display mode of the display 303 with the destination approach signal added.

Of the control operation of the control section 307a according to the embodiment, control of the display contents of a display screen 303a of the display 303 until the vehicle speed reaches predetermined speed or more after the engine starts is similar to that in the forth embodiment. In the fifth embodiment, the display mode of the display screen 303a is also switched between the display mode of a navigation image on the full display screen 303a and the mode shown in FIG. 27B in response to whether or not the vehicle speed reaches the predetermined speed or more while the vehicle is running as in the forth embodiment. Further, when entry of an all area display command is accepted through an instruction switch 305 in the state in which the display mode of the display screen 303a is held in the display mode in FIG. 27B, the display mode of the display screen 303a is switched from the mode shown in FIG. 27B to the mode shown in FIG. 27A as in the forth embodiment.

As the control operation peculiar to the fifth embodiment, if the vehicle speed falls below the predetermined speed and the display mode of the display screen 303a is switched to the mode shown in FIG. 27B (or the display mode of the display screen 303a is held in the mode shown in FIG. 27B, if the vehicle approaches the destination and the navigation apparatus 309 outputs the destination approach signal and the vehicle is positioned in the range of the predetermined distance from the destination (or the vehicle enters the range of the predetermined distance from the destination), the display mode of the display screen 3a is switched from the mode shown in FIG. 27B to the mode shown in FIG. 27A. Accordingly, the driver can check the circumstances surrounding the vehicle in detail at the vehicle stop time, etc. Particularly, the driver can drive the vehicle ahead closely with safety and easily at the parking time, etc., by seeing the image display of an image pickup area A3 in the slanting down direction at the front of the vehicle.

As described above, in the fifth embodiment, similar advantages to those in the forth embodiment can also be provided and when the vehicle arrives at the destination, the display mode of the display screen 303a is switched automatically to the display mode of displaying the images of all image pickup areas A1 to A3 in the three directions, so that the driver can check the circumstances surrounding the vehicle in detail at the vehicle stop time, etc.

In the embodiments described above, the image pickup unit 301 is installed in the front end part of the vehicle, but may be installed in a rear end part of the vehicle for picking up images of image pickup areas in the three directions of the left direction at the rear of the vehicle, the right direction at the rear, and the slanting down direction at the rear for display. In this case, to eliminate from the driver, etc., a sense of incompatibility between scenery at the rear of the vehicle on a rear check mirror, etc., in the cabin and the vehicle periphery image at the rear displayed on the display 303, preferably the images of the image pickup areas in the left and right directions at the rear and the image of the image pickup area in the slanting down direction at the rear are left-and-right inverted for display.

As described above, according to the vehicle periphery visual recognition system as in aspect 1, if a wide-range lens system having a horizontal view angle of 70 degrees or more is used, the resolution conversion section can enlarge any desired specified range of the image signal provided through the wide-range lens system for output to the display. Therefore, an image from which an unnecessary range is excluded can be displayed on an enlarged scale, so that it is made possible to provide compatibility between enlargement of the visual field range and enhancement of viewability.

According to the invention as in aspect 2, the image signal output from the image pickup unit contains a mirror image provided after light is once reflected by the light guide means and a normal image provided as light is incident on the wide-range lens system without being reflected by the light guide means. The controller can control so as to enlarge the specified ranges of the mirror image and the normal image or execute left and right inversion in response to the operation state of the vehicle, so that viewability can be enhanced.

According to the invention as in aspect 3, the image pickup device drive section can control the pixel read direction of the image pickup device and the pixel read range, so that the image signal in any desired pixel range can be output directly from the image pickup device and can also be left-and-light inverted for output. The controller need not have a circuit configuration for performing left and right inversion processing, and the cost of the controller can be reduced.

According to the invention as in aspect 4, the horizontal resolution of the image pickup device is enhanced, whereby the quality of the image enlarged in the horizontal direction by the resolution conversion section can be improved and viewability can be enhanced.

According to the invention as in aspect 5, the driver can check the image pickup ranges in the three directions of the left and right sides and the lower side in the periphery of the vehicle for safety.

According to the invention as in aspect 6, light reflection on the bottom of the prism is suppressed, so that it is made possible to prevent occurrence of a ghost image caused by unnecessary light is prevented, and viewability is enhanced.

According to the camera as in aspect 7, the prisms for making optical path change by twice internally reflecting light between the prism sides on the opposite visual field side and the visual field side are used to change the optical paths of the light from the side visual fields to the image pickup lens side, so that the optical path change can be made without mirror-image inverting of the light from the side visual fields. Therefore, the images of the side visual fields incident through the prisms and the front visual field incident without the intervention of the prisms can be picked up on the single image pickup device at the same time with the inversion directions matched.

According to the camera as in aspect 8, the prisms are placed symmetrically in a pair at the front of the image pickup lenses, the left prism side of the left prism is directed to the left visual field, and the right prism side of the right prism is directed to the right visual field, so that the images of the left and right side visual fields can be picked up at the same time with the inversion directions matched.

According to the camera as in aspect 9, metal is evaporated on the prism sides on the opposite visual field sides of the prisms, so that the prism sides on the opposite visual field sides can be made mirror surfaces to ensure total reflection.

According to the camera as in aspect 10, wide-range lenses are used as the image pickup lenses, so that if images of a plurality of side visual fields are picked up at the same time, the images can be picked up over the practically sufficient range.

According to the camera as in aspect 11, the image pickup direction of the image pickup means is directed toward the front and is inclined downward, and the light incident from the front visual view is input from the lower half area of the vertical view angle of the image pickup means, so that light from the front visual field sufficiently on this side of the vehicle can be input to the lower half area and an image of front scenery sufficiently on this side of the vehicle can be picked up.

According to the camera as in aspect 12, the prism is placed in an upright position at the front of the image pickup means and the portion projected to the lower half area of the vertical view angle of the image pickup means is cut, so that the optical paths of the light from the left and right visual fields can be changed to the image pickup lens side without blocking the incidence optical path of the light from the front visual field.

According to the camera as in aspect 13, light shield treatment is applied to the cut face of the prism, so that internal light reflection, external light reflection on the cut face (namely, the prism bottom) is prevented and a ghost image occurring as the light from the left, right (front) visual field is internally reflected (externally reflected) on the prism bottom is incident on the image pickup lenses, and formed as an image on the image pickup device can be prevented.

According to the camera as in aspect 14, when the number of the prisms is two or more, the prisms are formed in one piece, so that the angle adjustment between the prisms at the assembling time can be omitted for increasing efficiency of the assembling.

According to the camera as in aspect 15, a prism holder is formed integrally with the prism, so that attachment work of the prism holder can be omitted and the number of parts can be reduced.

According to the camera as in aspect 16, at least one of the prism side on the visual field side, the prism side on the opposite visual field side, and the prism back face of the prism is formed as a curved surface, so that the prism can be miniaturized.

Since the vehicle periphery monitoring apparatus as in aspect 17 uses a camera as in any of aspects 7 to 16 as the camera, the images of the side visual fields and the front visual field can be picked up by the single image pickup device at the same time with the inversion directions matched and the need for performing partial inversion processing for the images picked up by the image pickup device for matching the inversion directions of the image portions of the front visual field and the side visual fields as in the related art is eliminated and the signal processing circuit configuration of the processing section can be simplified.

According to the vehicle periphery monitoring apparatus as in aspect 18, the camera is installed at the front or rear of the vehicle and picks up images of three-direction visual fields of the visual fields in the left and right directions of the vehicle and the visual field in the travel or back direction at the same time, so that the images of the three-direction visual fields of the visual fields in the left and right directions of the vehicle and the visual field in the travel or back direction can be picked up at the same time according to the simple configuration.

According to the vehicle periphery monitoring apparatus as in aspect 19, the processing section superposes a mask image on an unnecessary portion of the image picked up by the camera for display on the display, so that the display image is well seen and viewability can be enhanced.

According to the vehicle periphery monitoring apparatus as in aspect 20, the processing section enlarges a necessary portion of the image picked up by the camera for display on the display, so that the display image is well seen and viewability can be enhanced.

According to the invention as in aspects 21 to 31, display of the image of at least any one of image pickup areas can be stopped in response to the operation state of the vehicle and display can be produced only when necessary for enhancing viewability of the vehicle periphery image.

According to the invention as in aspect 22, a predetermined different image is superposed on the image of any image pickup area and it is made substantially impossible to visually recognize the image, thereby stopping display of the image of the image pickup area, so that the superposed image can be provided with some display information.

According to the invention as in aspect 23, the situation of the three image pickup areas in the left direction at the front of the vehicle, the right direction at the front, and the slanting down direction at the front can be monitored.

According to the invention as in aspect 24, the situation of the three image pickup areas in the left direction at the rear of the vehicle, the right direction at the rear, and the slanting down direction at the rear can be monitored.

According to the invention as in aspect 27, the image given from a different vehicle-installed information apparatus can be displayed in place of the image of the image pickup area whose display is stopped.

According to the invention as in aspect 28, a navigation image can be displayed in place of the image of the image pickup area whose display is stopped.

According to the invention as in aspect 29, the driver can check the images of all the image pickup areas at the vehicle starting time, and can check the circumstances surrounding the vehicle in detail.

According to the invention as in aspect 30, operation entry is made through the input acceptance means in the state in which display of the image of at least any one image pickup area, of the images of the plurality of image pickup areas on the display means is stopped, whereby the images of all the image pickup areas can be displayed.

According to the invention as in aspect 31, if the distance between the current position and the destination becomes a predetermined distance or less, automatically the images of all the image pickup areas are displayed, so that the driver can arrive at the destination while monitoring the situation of the vehicle periphery in detail.

What is claimed is:

1. A camera comprising:
   image pickup means including a single image pickup device and image pickup lenses placed at the front of said image pickup device; and
   one or more prisms each shaped roughly like a triangle pole, placed at the front of said image pickup means with prism back faces directed to said image pickup lenses and prism sides directed to different side visual fields for twice internally reflecting light incident on the prism side on the visual field side between the prism side on the opposite visual field side and the prism side on the visual field side and emitting the light from the prism back face, wherein
   said image pickup means forms images of the incident light twice internally reflected through said prisms from the side visual fields and incident light from the front visual field without the intervention of said prisms on said image pickup device through said image pickup lenses at the same time.

2. The camera as in claim 1, wherein
   said prisms are placed symmetrically in a pair at the front of said image pickup means with the left prism side of the left prism directed to the left visual field and the right prism side of the right prism directed to the right visual field.

3. The camera as in claim 1, wherein
   metal is evaporated on the prism side on the opposite visual field side of said prism.

4. The camera as in claim 1, wherein
   said image pickup lens is a wide-range lens.

5. The camera as in claim 1, wherein
   said image pickup means is placed with the image pickup direction directed to the front and inclined downward, and inputs the incident light from the front visual field from the lower half area of a vertical view angle of said image pickup means and the incident light through said prisms from the side visual fields from the upper half area of the vertical view angle.

6. The camera as claimed in claim 5, wherein
   said prism is placed in an upright position at the front of said image pickup means, and
   a portion projected to the lower half area of the vertical view angle of said image pickup means is cut.

7. The camera as claimed in claim 6, wherein
   light shield treatment is applied to the cut face of said prism.

8. The camera as in claim 1, wherein
   when the number of said prisms is two or more, said prisms are formed in one piece.

9. The camera as in claim 1, wherein
   a prism holder is formed integrally with said prism.

10. The camera as in claim 1, wherein
    at least one of the prism side on the visual field side, the prism side on the opposite visual field side and the prism back face of said prism is formed as a curved surface.

11. A vehicle periphery monitoring apparatus comprising:
    a camera as claimed in claim 1 being installed in a vehicle for picking up images of a plurality of visual fields in the periphery of the vehicle;
    a processing section for processing the images picked up by said camera; and
    a display being installed in a cabin for displaying the images processed by said processing section.

12. The vehicle periphery monitoring apparatus as in claim 11, wherein
    said camera is installed at the front or rear of the vehicle and picks up images of three-direction visual fields of the visual fields in the left and right directions of the vehicle and the visual field in the travel or back direction at the same time.

13. The vehicle periphery monitoring apparatus as claim 11, wherein
    said processing section superposes a mask image on an unnecessary portion of the image picked up by said camera for display on said display.

14. The vehicle periphery monitoring apparatus as in claim 11, wherein
    said processing section enlarges a necessary portion of the image picked up by said camera for display on said display.

* * * * *